United States Patent
Nakajima et al.

(10) Patent No.: US 10,647,920 B2
(45) Date of Patent: May 12, 2020

(54) LIQUID CRYSTALLINE COMPOSITION, LIQUID CRYSTAL CURED LAYER, METHOD FOR PRODUCING SAME, AND OPTICAL FILM

(71) Applicant: ZEON CORPORATION, Chiyoda-ku, Tokyo (JP)

(72) Inventors: Shunpei Nakajima, Tokyo (JP); Akira Ikeda, Tokyo (JP); Masakazu Saito, Tokyo (JP); Manabu Ito, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 61 days.

(21) Appl. No.: 16/061,020

(22) PCT Filed: Dec. 14, 2016

(86) PCT No.: PCT/JP2016/087315
§ 371 (c)(1),
(2) Date: Jun. 11, 2018

(87) PCT Pub. No.: WO2017/110638
PCT Pub. Date: Jun. 29, 2017

(65) Prior Publication Data
US 2019/0225884 A1 Jul. 25, 2019

(30) Foreign Application Priority Data

Dec. 22, 2015 (JP) .................. 2015-250685

(51) Int. Cl.
| C09K 19/38 | (2006.01) |
| C08F 222/32 | (2006.01) |
| G02F 1/13363 | (2006.01) |
| G02F 1/13 | (2006.01) |
| G02B 5/30 | (2006.01) |
| C09K 19/54 | (2006.01) |
| C08F 222/24 | (2006.01) |

(52) U.S. Cl.
CPC ........ C09K 19/3861 (2013.01); C08F 222/24 (2013.01); C09K 19/38 (2013.01); C09K 19/54 (2013.01); G02B 5/30 (2013.01); G02B 5/3016 (2013.01); G02F 1/13 (2013.01); G02F 1/13363 (2013.01); C08F 2800/20 (2013.01)

(58) Field of Classification Search
CPC .............. C08F 222/32; C09K 19/3861; C09K 19/3852; C09K 19/54; G02F 1/13363
See application file for complete search history.

(56) References Cited

U.S. PATENT DOCUMENTS

| 2010/0285008 A1 | 11/2010 | Kelley |
| 2010/0297113 A1 | 11/2010 | Kelley et al. |
| 2014/0142266 A1 | 5/2014 | Sakamoto et al. |
| 2015/0265564 A1 | 9/2015 | Kelley |
| 2016/0145363 A1 | 5/2016 | Sakamoto et al. |
| 2016/0245972 A1 | 8/2016 | Yamanaka et al. |

FOREIGN PATENT DOCUMENTS

| JP | 2005336103 A | 12/2005 | |
| JP | 2011042606 A | 3/2011 | |
| JP | 2015111257 A | 6/2015 | |
| WO | 2009042544 A1 | 4/2009 | |
| WO | 2012147904 A1 | 11/2012 | |
| WO | WO-2012147904 A1 * | 11/2012 | ........... C07D 215/38 |
| WO | WO-2013094969 A2 * | 6/2013 | ............... G02B 5/30 |

OTHER PUBLICATIONS

Jan. 24, 2017, International Search Report issued in the International Patent Application No. PCT/JP2016/087315.
Jun. 26, 2018, International Preliminary Report on Patentability issued in the International Patent Application No. PCT/JP2016/087315.

* cited by examiner

*Primary Examiner* — Vu A Nguyen
(74) *Attorney, Agent, or Firm* — Kenjia IP Law PC

(57) ABSTRACT

A liquid crystal composition including: a polymerizable liquid crystal compound capable of expressing birefringence with inverse wavelength dispersion; and a (meth)acrylate compound containing two or more (meth)acryloyl groups per one molecule, wherein: an amount of the (meth)acrylate compound is 8 parts by weight or less, the amount being relative to 100 parts by weight of a sum total of the polymerizable liquid crystal compound and the (meth)acrylate compound.

9 Claims, No Drawings

LIQUID CRYSTALLINE COMPOSITION, LIQUID CRYSTAL CURED LAYER, METHOD FOR PRODUCING SAME, AND OPTICAL FILM

FIELD

The present invention relates to a liquid crystal composition, a liquid crystal cured layer using a liquid crystal cured product of the liquid crystal composition and a production method thereof, and an optical film.

BACKGROUND

As a method for producing an optical film having a retardation with inverse wavelength dispersion, there is known a method using a polymerizable liquid crystal compound capable of expressing birefringence with inverse wavelength dispersion. In this method, a liquid crystal composition containing the aforementioned polymerizable liquid crystal compound is applied onto a suitable substrate such as a resin film to form a layer, the polymerizable liquid crystal compound is oriented in the layer of the liquid crystal composition, and the layer is cured while the orientation of the polymerizable liquid crystal compound is kept in a state of being maintained. A retardation with inverse wavelength dispersion is expressed in the liquid crystal cured layer obtained by curing the layer of the liquid crystal composition, whereby the aforementioned method can provide a desired optical film (see Patent Literature 1).

CITATION LIST

Patent Literature

Patent Literature 1: International Publication No. 2012/147904

SUMMARY

Technical Problem

In an optical film produced using a liquid crystal composition, the hardness of the liquid crystal cured layer may sometimes need to increase in order to enhance the scratch resistance of the optical film. A possible method for enhancing the hardness of the liquid crystal cured layer may be employment of a liquid crystal composition containing a cross-linking agent to generate cross-linking of molecules contained in the liquid crystal cured layer.

According to the inventors' studies, it has been revealed that when a liquid crystal composition containing a cross-linking agent and a polymerizable liquid crystal compound capable of expressing birefringence with inverse wavelength dispersion is used, the orientation quality of molecules in the liquid crystal cured layer is degraded and orientation defects are likely to be generated.

The present invention has been made in view of the aforementioned problems. An object of the present invention is to provide a liquid crystal composition with which a liquid crystal cured layer having a high hardness and suppressed orientation defect can be produced; a liquid crystal cured layer having a high hardness and suppressed orientation defect and a production method of the same; and an optical film including a liquid crystal cured layer having a high hardness and suppressed orientation defect.

Solution to Problem

The present inventors have intensively conducted studies to solve the aforementioned problems. As a result, the inventors have found that a liquid crystal cured layer having a high hardness and suppressed orientation defect can be produced by using a liquid crystal composition containing a polymerizable liquid crystal compound capable of expressing birefringence with inverse wavelength dispersion and a (meth)acrylate compound containing two or more (meth)acryloyl groups per one molecule in a specific amount. The present invention has thus been completed.

That is, the present invention is as follows:

(1) A liquid crystal composition comprising:
a polymerizable liquid crystal compound capable of expressing birefringence with inverse wavelength dispersion; and
a (meth)acrylate compound containing two or more (meth)acryloyl groups per one molecule, wherein:
an amount of the (meth)acrylate compound is 8 parts by weight or less, the amount being relative to 100 parts by weight of a sum total of the polymerizable liquid crystal compound and the (meth)acrylate compound.

(2) The liquid crystal composition according to (1), wherein the (meth)acrylate compound has an acrylic equivalent of 140 or lower.

(3) The liquid crystal composition according to (1) or (2), wherein the (meth)acrylate compound contains an isocyanate group.

(4) The liquid crystal composition according to any one of (1) to (3), wherein the polymerizable liquid crystal compound contains a main chain mesogen and a side chain mesogen bonded to the main chain mesogen in a molecule of the polymerizable liquid crystal compound.

(5) The liquid crystal composition according to any one of (1) to (4), wherein the polymerizable liquid crystal compound is represented by the following Formula (I):

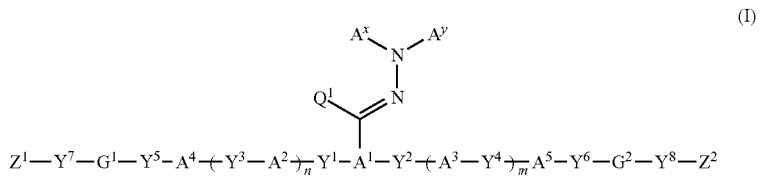

(in the Formula (I), $Y^1$ to $Y^8$ are each independently a chemical single bond, —O—, —S—, —O—C(=O)—, —C(=O)—O—, —O—C(=O)—O—, —NR$^1$—C(=O)—, —C(=O)—NR$^1$—, —O—C(=O)—NR$^1$—, —NR$^1$—C(=O)—O—, —NR$^1$—C(=O)—NR$^1$—, —O—NR$^1$—, or —NR$^1$—O—, wherein R$^1$ is a hydrogen atom or an alkyl group of 1 to 6 carbon atoms;

$G^1$ and $G^2$ are each independently a divalent aliphatic group of 1 to 20 carbon atoms optionally having a substituent; the aliphatic groups may have one or more per one aliphatic group of —O—, —S—, —O—C(=O)—, —C(=O)—O—, —O—C(=O)—O—, —NR$^2$—C(=O)—, —C(=O)—NR$^2$—, —NR$^2$—, or —C(=O)— inserted therein; with a proviso that cases where two or more of each of —O— or —S— groups are adjacently inserted are excluded, wherein $R^2$ is a hydrogen atom or an alkyl group of 1 to 6 carbon atoms;

$Z^1$ and $Z^2$ are each independently an alkenyl group of 2 to 10 carbon atoms optionally being substituted by a halogen atom;

$A^x$ is an organic group of 2 to 30 carbon atoms having at least one aromatic ring selected from the group consisting of an aromatic hydrocarbon ring and an aromatic heterocyclic ring;

$A^y$ is a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—R$^3$, —SO$_2$—R$^4$, —C(=S)NH—R$^9$, or an organic group of 2 to 30 carbon atoms having at least one aromatic ring selected from the group consisting of an aromatic hydrocarbon ring and an aromatic heterocyclic ring, wherein $R^3$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms; $R^4$ is an alkyl group of 1 to 20 carbon atoms, an alkenyl group of 2 to 20 carbon atoms, a phenyl group, or a 4-methylphenyl group; $R^9$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent; the aromatic ring that $A^x$ and $A^y$ have may have a substituent; and $A^x$ and $A^y$ may form a ring together;

$A^1$ is a trivalent aromatic group optionally having a substituent;

$A^2$ and $A^3$ are each independently a divalent alicyclic hydrocarbon group of 3 to 30 carbon atoms optionally having a substituent;

$A^4$ and $A^5$ are each independently a divalent aromatic group of 6 to 30 carbon atoms optionally having a substituent;

$Q^1$ is a hydrogen atom or an alkyl group of 1 to 6 carbon atoms optionally having a substituent; and m and n are each independently 0 or 1).

(6) A liquid crystal cured layer formed of a cured product of the liquid crystal composition according to any one of (1) to (5).

(7) The liquid crystal cured layer according to (6), wherein an increased haze value is 0.6% or less when a surface of the liquid crystal cured layer is rubbed with nonwoven fabric having a diameter of 12 mm and made of lyocell under conditions of an application load of 200 g, a moving speed of the nonwoven fabric of 2,000 mm/min, a moving distance of the nonwoven fabric of 30 mm, and a rubbing number with the nonwoven fabric of thirty reciprocations.

(8) A method for producing a liquid crystal cured layer, comprising:

a step of forming a layer of the liquid crystal composition according to any one of (1) to (5) on a supporting surface;

a step of causing orientation of the polymerizable liquid crystal compound contained in the layer of the liquid crystal composition; and a step of curing the layer of the liquid crystal composition.

(9) An optical film comprising the liquid crystal cured layer according to (6) or (7).

Advantageous Effects of Invention

According to the present invention, there can be provided a liquid crystal composition with which a liquid crystal cured layer having a high hardness and suppressed orientation defect can be produced; a liquid crystal cured layer having a high hardness and suppressed orientation defect and a production method of the same; and an optical film including a liquid crystal cured layer having a high hardness and suppressed orientation defect.

DESCRIPTION OF EMBODIMENTS

Hereinafter, the present invention will be described in detail with reference to examples and embodiments. However, the present invention is not limited to the following examples and embodiments and may be freely modified and practiced without departing from the scope of claims of the present invention and the scope of their equivalents.

In the following description, the term "meth(acrylate)" encompasses both "acrylate" and "methacrylate", unless otherwise specified. In the following description, the term "(meth)acryloyl group" encompasses both an "acryloyl group" (i.e., —C(=O)—CH=CH$_2$) and a "methacryloyl group" (i.e., —C(=O)—C(—CH$_3$)=CH$_2$), unless otherwise specified.

In the following description, the terms "polarizing plate" and "wavelength plate" encompass a flexible film and sheet such as a resin film, unless otherwise specified.

In the following description, a resin having a positive intrinsic birefringence means a resin that exhibits a larger refractive index in a stretching direction than that in a direction orthogonal to the stretching direction. A resin having a negative intrinsic birefringence means a resin that exhibits a smaller refractive index in a stretching direction than that in a direction orthogonal to the stretching direction. The intrinsic birefringence may be calculated from dielectric constant distribution.

In the following description, a retardation of a certain layer represents an in-plane retardation Re, unless otherwise specified. Such an in-plane retardation Re refers to a value represented by Re=(nx−ny)×d, unless otherwise specified. Herein, nx represents a refractive index in a direction that gives, among directions perpendicular to the thickness direction of the layer (in-plane directions), the maximum refractive index. ny represents a refractive index in a direction that is perpendicular to the direction of nx among the in-plane directions of the layer. d represents a thickness of the layer. The measurement wavelength of a retardation is 550 nm, unless otherwise specified.

In the following description, a direction of a slow axis of a certain layer refers to a direction of a slow axis in an in-plane direction, unless otherwise specified.

In the following description, a direction of an element that is "parallel" and "perpendicular" may include an error within a range that does not impair the effects of the present invention, for example, within a range of ±50, preferably ±3°, and more preferably ±1° unless otherwise specified.

[1. Summary of Liquid Crystal Composition]

The liquid crystal composition of the present invention contains a polymerizable liquid crystal compound capable of expressing birefringence with inverse wavelength dispersion, and a (meth)acrylate compound containing two or more (meth)acryloyl groups per one molecule. In the following description, the polymerizable liquid crystal compound capable of expressing birefringence with inverse wavelength dispersion may be appropriately referred to as an "inverse wavelength polymerizable liquid crystal compound". In the following description, the (meth)acrylate compound containing two or more (meth)acryloyl groups per one molecule may be appropriately referred to as a "multifunctional (meth)acrylate compound".

In the liquid crystal composition of the present invention, the amount of the multifunctional (meth)acrylate compound falls within a specific range. When such a liquid crystal composition is cured while the inverse wavelength polymerizable liquid crystal compound is kept in a state of being oriented, a liquid crystal cured layer having a high hardness and suppressed orientation defect can be produced.

[2. Inverse Wavelength Polymerizable Liquid Crystal Compound]

The inverse wavelength polymerizable liquid crystal compound is a liquid crystal compound having a polymerization ability. Since the inverse wavelength polymerizable liquid crystal compound is a liquid crystal compound having liquid crystalline properties, when the inverse wavelength polymerizable liquid crystal compound is oriented, it expresses a liquid crystal phase. Since the inverse wavelength polymerizable liquid crystal compound is a compound having a polymerization ability, the inverse wavelength polymerizable liquid crystal compound can be polymerized in the state of expressing the liquid crystal phase as mentioned above, so as to become a polymer in which the orientation of molecules in the liquid crystal phase is maintained.

The inverse wavelength polymerizable liquid crystal compound is also a compound capable of expressing birefringence with inverse wavelength dispersion. The compound capable of expressing birefringence with inverse wavelength dispersion herein refers to a compound the polymer of which obtained in the aforementioned manner expresses birefringence with inverse wavelength dispersion.

The birefringence with inverse wavelength dispersion means birefringence in which a birefringence $\Delta n(450)$ at a wavelength of 450 nm and a birefringence $\Delta n(650)$ at a wavelength of 650 nm satisfy the following equation (D1). The aforementioned inverse wavelength polymerizable liquid crystal compound capable of expressing birefringence with inverse wavelength dispersion can usually express larger birefringence at a longer measurement wavelength. Therefore, the birefringence of the polymer obtained by polymerization of the inverse wavelength polymerizable liquid crystal compound as described above usually satisfies the following equation (D2). In the following equation (D2), $\Delta n(550)$ represents a birefringence at a measurement wavelength of 550 nm.

$$\Delta n(450) < \Delta n(650) \tag{D1}$$

$$\Delta n(450) < \Delta n(550) < \Delta n(650) \tag{D2}$$

As the inverse wavelength polymerizable liquid crystal compound, a compound containing a main chain mesogen and a side chain mesogen bonded to the main chain mesogen in a molecule of the inverse wavelength polymerizable liquid crystal compound may be used. While the inverse wavelength polymerizable liquid crystal compound containing the main chain mesogen and the side chain mesogen is in a state of being oriented, the side chain mesogen may be oriented in a direction different from the main chain mesogen. Therefore, in the polymer obtained by polymerization of the inverse wavelength polymerizable liquid crystal compound while such orientation is maintained, the main chain mesogen and the side chain mesogen may be oriented in different directions. In this case, the birefringence is expressed as a difference between the refractive index of the main chain mesogen and the refractive index of the side chain mesogen. As a result, the inverse wavelength polymerizable liquid crystal compound and the polymer thereof can express birefringence with inverse wavelength dispersion.

The steric structure of the compound having the main chain mesogen and the side chain mesogen described above is a specific structure that is different from that of an ordinary forward wavelength polymerizable liquid crystal compound. Herein, the "forward wavelength polymerizable liquid crystal compound" means a polymerizable liquid crystal compound capable of expressing birefringence with forward wavelength dispersion. The birefringence with forward wavelength dispersion represents a birefringence of which the absolute value is smaller as the measurement wavelength is longer. As the inverse wavelength polymerizable liquid crystal compound has such a specific steric structure, the liquid crystal composition containing the inverse wavelength polymerizable liquid crystal compound may generally show different properties from those of a liquid crystal composition containing a forward wavelength polymerizable liquid crystal compound. The liquid crystal composition of the present invention contains the inverse wavelength polymerizable liquid crystal compound and the multifunctional (meth)acrylate compound in combination at a specific amount ratio. Thus, the liquid crystal composition of the present invention can thereby express specific effect that is different from those of the liquid crystal composition containing the forward wavelength polymerizable liquid crystal compound. Here, the specific effect is achievement in both the improvement in hardness and suppressed orientation defects of the liquid crystal cured layer produced from the liquid crystal composition. According to the present inventors' studies, it is inferable that one factor for providing the aforementioned specific effects is that the inverse wavelength polymerizable liquid crystal compound has the specific steric structure as mentioned above. However, the technical scope of the present invention is not limited by the aforementioned inference.

The molecular weight of the inverse wavelength polymerizable liquid crystal compound is preferably 300 or more, more preferably 700 or more, and particularly preferably 1,000 or more, and is preferably 2,000 or less, more preferably 1,700 or less, and particularly preferably 1,500 or less. That the inverse wavelength polymerizable liquid crystal compound has the aforementioned molecular weight represents that the inverse wavelength polymerizable liquid crystal compound is a monomer. When the inverse wavelength polymerizable liquid crystal compound, which is not a polymer but a monomer, is used, the application properties of the liquid crystal composition can be particularly improved.

As the inverse wavelength polymerizable liquid crystal compound, one type thereof may be solely used, and two or more types thereof may also be used in combination at any ratio.

Examples of the aforementioned inverse wavelength polymerizable liquid crystal compound may include compounds represented by the following formula (Ia). In the following description, the compounds represented by the formula (Ia) may be appropriately referred to as the "compound (Ia)".

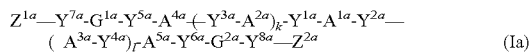

(Ia)

In the formula (Ia) described above, $A^{1a}$ represents an aromatic hydrocarbon ring group having as a substituent an organic group of 1 to 67 carbon atoms that has at least one aromatic ring selected from the group consisting of an aromatic hydrocarbon ring and an aromatic heterocycle; or an aromatic heterocycle group having as a substituent an organic group of 1 to 67 carbon atoms that has at least one aromatic ring selected from the group consisting of an aromatic hydrocarbon ring and an aromatic heterocycle.

Specific examples of $A^{1a}$ may include a phenylene group substituted with a group represented by a formula: —C(R$^f$)=N—N(R)R$^h$ or a formula: —C(R$^f$)=N—N=C(R$^{f1}$)R$^h$; a benzothiazol-4,7-diyl group substituted with a 1-benzofuran-2-yl group; a benzothiazol-4,7-diyl group substituted with a 5-(2-butyl)-1-benzofuran-2-yl group; a benzothiazol-4,7-diyl group substituted with a 4,6-dimethyl-1-benzofuran-2-yl group; a benzothiazol-4,7-diyl group substituted with a 6-methyl-1-benzofuran-2-yl group; a benzothiazol-4,7-diyl group substituted with a 4,6,7-trimethyl-1-benzofuran-2-yl group; a benzothiazol-4,7-diyl group substituted with a 4,5,6-trimethyl-1-benzofuran-2-yl group; a benzothiazol-4,7-diyl group substituted with a 5-methyl-1-benzofuran-2-yl group; a benzothiazol-4,7-diyl group substituted with a 5-propyl-1-benzofuran-2-yl group; a benzothiazol-4,7-diyl group substituted with a 7-propyl-1-benzofuran-2-yl group; a benzothiazol-4,7-diyl group substituted with a 5-fluoro-1-benzofuran-2-yl group; a benzothiazol-4,7-diyl group substituted with a phenyl group; a benzothiazol-4,7-diyl group substituted with a 4-fluorophenyl group; a benzothiazol-4,7-diyl group substituted with a 4-nitrophenyl group; a benzothiazol-4,7-diyl group substituted with a 4-trifluoromethylphenyl group; a benzothiazol-4,7-diyl group substituted with a 4-cyanophenyl group; a benzothiazol-4,7-diyl group substituted with a 4-methansulfonylphenyl group; a benzothiazol-4,7-diyl group substituted with a thiophen-2-yl group; a benzothiazol-4,7-diyl group substituted with a thiophen-3-yl group; a benzothiazol-4,7-diyl group substituted with a 5-methylthiophen-2-yl group; a benzothiazol-4,7-diyl group substituted with a 5-chlorothiophen-2-yl group; a benzothiazol-4,7-diyl group substituted with a thieno[3,2-b]thiophen-2-yl group; a benzothiazol-4,7-diyl group substituted with a 2-benzothiazoryl group; a benzothiazol-4,7-diyl group substituted with a 4-biphenyl group; a benzothiazol-4,7-diyl group substituted with a 4-propylbiphenyl group; a benzothiazol-4,7-diyl group substituted with a 4-thiazolyl group; a benzothiazol-4,7-diyl group substituted with a 1-phenylethylen-2-yl group; a benzothiazol-4,7-diyl group substituted with a 4-pyridyl group; a benzothiazol-4,7-diyl group substituted with a 2-furyl group; a benzothiazol-4,7-diyl group substituted with a naphtho[1,2-b]furan-2-yl group; a 1H-isoindole-1,3(2H)-dione-4,7-diyl group substituted with a 5-methoxy-2-benzothiazolyl group; a 1H-isoindole-1,3(2H)-dione-4,7-diyl group substituted with a phenyl group; a 1H-isoindole-1,3(2H)-dione-4,7-diyl group substituted with a 4-nitrophenyl group; and a 1H-isoindole-1,3(2H)-dione-4,7-diyl group substituted with a 2-thiazolyl group. Herein, R$^f$ and R$^{f1}$ are each independently represent the same meaning as that of $Q^1$ described later. R$^g$ represents the same meaning as that of $A^y$ described later. R$^h$ represents the same meaning as that of $A^x$ described later.

In the aforementioned formula (Ia), $Y^{1a}$ to $Y^{8a}$ each independently represent a chemical single bond, —O—, —S—, —O—C(=O)—, —C(=O)—O—, —O—C(=O)—O—, NR$^1$—C(=O)—, —C(=O)—NR$^1$—, —O—C(=O)—NR$^1$—, —NR$^1$—C(=O)—O—, —NR$^1$—C(=O)—NR$^1$—, —O—NR$^1$—, or —NR$^1$—O—. Herein, $R^1$ represents a hydrogen atom or an alkyl group of 1 to 6 carbon atoms.

In the aforementioned formula (Ia), $G^{1a}$ and $G^{2a}$ each independently represent a divalent aliphatic group of 1 to 20 carbon atoms optionally having a substituent. In the aliphatic group, one or more of —O—, —S—, —O—C(=O)—, —C(=O)—O—, —O—C(=O)—O—, —NR$^2$—C(=O)—, —C(=O)—NR$^2$—, —NR$^2$—, or —C(=O)— may be interposed per one aliphatic group, with a proviso that cases where 2 or more of —O— or —S— are adjacently interposed therein are excluded. Herein, $R^2$ represents a hydrogen atom or an alkyl group of 1 to 6 carbon atoms.

In the aforementioned formula (Ia), $Z^{1a}$ and $Z^{2a}$ each independently represent an alkenyl group of 2 to 20 carbon atoms optionally substituted with a halogen atom.

In the aforementioned formula (Ia), $A^{2a}$ and $A^{3a}$ each independently represent a divalent alicyclic hydrocarbon group of 3 to 30 carbon atoms optionally having a substituent.

In the aforementioned formula (Ia), $A^{4a}$ and $A^{5a}$ each independently represent a divalent aromatic group of 6 to 30 carbon atoms optionally having a substituent.

In the aforementioned formula (Ia), k and 1 each independently represent 0 or 1.

Specific examples of preferable inverse wavelength polymerizable liquid crystal compounds may include a compound represented by the following formula (I). In the following description, the compound represented by the formula (I) may be appropriately referred to as "compound (I)"

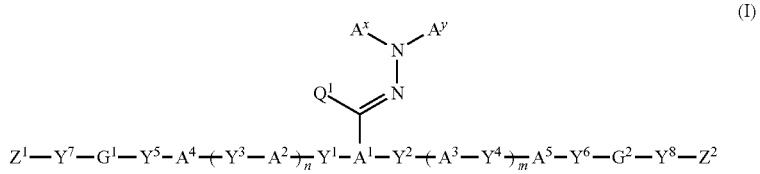

(I)

As shown in the following formula, the compound (I) usually includes two mesogen skeletons including a main chain mesogen 1a composed of a group —Y$^5$-A$^4$-(Y$^3$-A$^2$)$_n$-Y$^1$-A$^1$-Y$^2$-(A$^3$-Y$^4$)$_m$-A$^5$-Y$^6$— and a side chain mesogen 1b composed of a group >A$^1$-C(Q$^1$)=N—N(A$^x$)A$^y$. The main chain mesogen 1a and the side chain mesogen 1b cross each other. The aforementioned main chain mesogen 1a and side chain mesogen 1b may be collectively regarded as one mesogen, but in the present invention, are described as two separate mesogens.

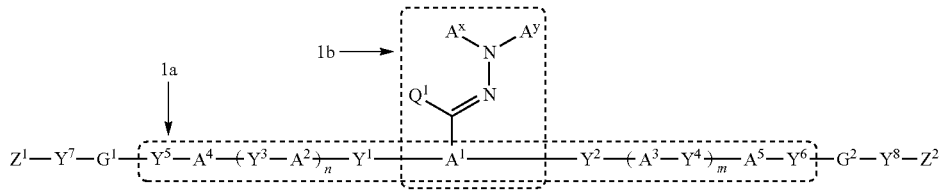

The refractive index of the main chain mesogen 1a in the long-axis direction is denoted by n1, and the refractive index of the side chain mesogen 1b in the long-axis direction is denoted by n2. In this case, the absolute value and wavelength dispersion of the refractive index n1 usually depend on the molecular structure of the main chain mesogen 1a. The absolute value and wavelength dispersion of the refractive index n2 usually depend on the molecular structure of the side chain mesogen 1b. Herein, the inverse wavelength polymerizable liquid crystal compound is usually subjected to rotational motion around the long-axis direction of the main chain mesogen 1a as a rotational axis in the liquid crystal phase. Therefore, the refractive indices n1 and n2 herein represent the refractive index of a rotating body.

Due to the molecular structures of the main chain mesogen 1a and the side chain mesogen 1b, the absolute value of the refractive index n1 is larger than the absolute value of the refractive index n2. Further, the refractive indices n1 and n2 usually exhibit forward wavelength dispersion. A refractive index with forward wavelength dispersion herein means a refractive index of which the absolute value becomes smaller as the measurement wavelength is longer. The refractive index n1 of the main chain mesogen 1a exhibits small forward wavelength dispersion. Therefore, although the refractive index n1 measured at a long wavelength is smaller than the refractive index n1 measured at a short wavelength, the difference thereof is small. In contrast, the refractive index n2 of the side chain mesogen 1b exhibits large forward wavelength dispersion. Therefore, the refractive index n2 measured at a long wavelength is smaller than the refractive index n2 measured at a short wavelength, and the difference thereof is large. Consequently, the difference Δn between the refractive index n1 and the refractive index n2 is small at the short measurement wavelength, and the difference Δn between the refractive index n1 and the refractive index n2 is large at the long measurement wavelength. Accordingly, the birefringence with inverse wavelength dispersion can be expressed on the basis of the main chain mesogen 1a and the side chain mesogen 1b.

In the formula (I) mentioned above, $Y^1$ to $Y^8$ are each independently a chemical single bond, —O—, —S—, —O—C(=O)—, —C(=O)—O—, —O—C(=O)—O—, —NR$^1$—C(=O)—, —C(=O)—NR$^1$—, —O—C(=O)—NR$^1$—, —NR$^1$—C(=O)—O—, —NR$^1$—C(=O)—NR$^1$—, —O—NR$^1$—, or —NR$^1$—O—.

Herein, $R^1$ is a hydrogen atom or an alkyl group of 1 to 6 carbon atoms.

Examples of the alkyl group of 1 to 6 carbon atoms of $R^1$ may include a methyl group, an ethyl group, a n-propyl group, an isopropyl group, a n-butyl group, a sec-butyl group, a t-butyl group, a n-pentyl group, and a n-hexyl group.

It is preferable that $R^1$ is a hydrogen atom or an alkyl group of 1 to 4 carbon atoms.

In the compound (I), it is preferable that $Y^1$ to $Y^8$ are each independently a chemical single bond, —O—, —O—C(=O)—, —C(=O)—O—, or —O—C(=O)—O—.

In the formula (I) mentioned above, $G^1$ and $G^2$ are each independently a divalent aliphatic group of 1 to 20 carbon atoms optionally having a substituent.

Examples of the divalent aliphatic group of 1 to 20 carbon atoms may include a divalent aliphatic group having a linear structure, such as an alkylene group of 1 to 20 carbon atoms and an alkenylene group of 2 to 20 carbon atoms; and a divalent aliphatic group, such as a cycloalkanediyl group of 3 to 20 carbon atoms, a cycloalkenediyl group of 4 to 20 carbon atoms, and a divalent alicyclic fused ring group of 10 to 30 carbon atoms.

Examples of the substituent in the divalent aliphatic group of $G^1$ and $G^2$ may include a halogen atom, such as a fluorine atom, a chlorine atom, a bromine atom, and an iodine atom; and an alkoxy group of 1 to 6 carbon atoms, such as a methoxy group, an ethoxy group, a n-propoxy group, an isopropoxy group, a n-butoxy group, a sec-butoxy group, a t-butoxy group, a n-pentyloxy group, and a n-hexyloxy group. Among these, a fluorine atom, a methoxy group, and an ethoxy group are preferable.

The aforementioned aliphatic groups may have one or more per one aliphatic group of —O—, —S—, —O—C(=O)—, —C(=O)—O—, —O—C(=O)—O—, —NR$^2$—C(=O)—, —C(=O)—NR$^2$—, —NR$^2$—, or —C(=O)— inserted therein. However, cases where two or more —O— or —S— are adjacently inserted are excluded. Herein, $R^2$ is a hydrogen atom or an alkyl group of 1 to 6 carbon atoms. It is preferable that $R^2$ is a hydrogen atom or a methyl group.

It is preferable that the group inserted into the aliphatic groups is —O—, —O—C(=O)—, —C(=O)—O—, or —C(=O)—.

Specific examples of the aliphatic groups into which the group is inserted may include —CH$_2$—CH$_2$—O—CH$_2$—CH$_2$—, —CH$_2$—CH$_2$—S—CH$_2$—CH$_2$—, —CH$_2$—CH$_2$—O—C(=O)—CH$_2$—CH$_2$—, —CH$_2$—CH$_2$—C(=O)—O—CH$_2$—CH$_2$—, —CH$_2$—CH$_2$—C(=O)—O—CH$_2$—, —CH$_2$—O—C(=O)—O—CH$_2$—CH$_2$—, —CH$_2$—CH$_2$—NR$^2$—C(=O)—CH$_2$—CH$_2$—, —CH$_2$—CH$_2$—C(=O)—NR$^2$—CH$_2$—, —CH$_2$—NR$^2$—CH$_2$—CH$_2$—, and —CH$_2$—C(=O)—CH$_2$—.

Among these, from the viewpoint of more favorably expressing the desired effect of the present invention, $G^1$ and $G^2$ are each independently preferably a divalent aliphatic group having a linear structure, such as an alkylene group of 1 to 20 carbon atoms and an alkenylene group of 2 to 20 carbon atoms, more preferably an alkylene group of 1 to 12 carbon atoms, such as a methylene group, an ethylene group, a trimethylene group, a propylene group, a tetramethylene group, a pentamethylene group, a hexamethylene group, an octamethylene group, and a decamethylene group [—$(CH_2)_{10}$—], and particularly preferably a tetramethylene group [—$(CH_2)_4$—], a hexamethylene group [—$(CH_2)_6$—], an octamethylene group [—$(CH_2)_8$—], or a decamethylene group [—$(CH_2)_{10}$—].

In the formula (I) mentioned above, $Z^1$ and $Z^2$ are each independently an alkenyl group of 2 to 10 carbon atoms that may be substituted by a halogen atom.

It is preferable that the number of carbon atoms in the alkenyl group is 2 to 6. Examples of the halogen atom that is a substituent in the alkenyl group of $Z^1$ and $Z^2$ may include a fluorine atom, a chlorine atom, and a bromine atom. A chlorine atom is preferable.

Specific examples of the alkenyl group of 2 to 10 carbon atoms of $Z^1$ and $Z^2$ may include $CH_2$=CH—, $CH_2$=C($CH_3$)—, $CH_2$=CH—$CH_2$—, $CH_3$—CH=CH—, $CH_2$=CH—$CH_2$—$CH_2$—, $CH_2$=C($CH_3$)—$CH_2$—$CH_2$—, $(CH_3)_2$C=CH—$CH_2$—, $(CH_3)_2$C=CH—$CH_2$—$CH_2$—, $CH_2$=C(Cl)—, $CH_2$=C($CH_3$)—$CH_2$—, and $CH_3$—CH=CH—$CH_2$—.

Among these, from the viewpoint of favorably expressing the desired effect of the present invention, $Z^1$ and $Z^2$ are each independently preferably $CH_2$=CH—, $CH_2$=C($CH_3$)—, $CH_2$=C(Cl)—, $CH_2$=CH—$CH_2$—, $CH_2$=C($CH_3$)—$CH_2$—, or $CH_2$=C($CH_3$)—$CH_2$—$CH_2$—, more preferably $CH_2$=CH—, $CH_2$=C($CH_3$)— or $CH_2$=C(Cl)—, and particularly preferably $CH_2$=CH—.

In the formula (I) mentioned above, $A^x$ is an organic group of 2 to 30 carbon atoms having at least one aromatic ring selected from the group consisting of an aromatic hydrocarbon ring and an aromatic heterocyclic ring. The "aromatic ring" means a cyclic structure having aromaticity in the broad sense based on Huckel rule, that is, a cyclic conjugated structure having (4n+2) π electrons, and a cyclic structure that exhibits aromaticity by involving a lone pair of electrons of a heteroatom, such as sulfur, oxygen, and nitrogen, in a π electron system, typified by thiophene, furan, and benzothiazole.

The organic group of 2 to 30 carbon atoms having at least one aromatic ring selected from the group consisting of an aromatic hydrocarbon ring and an aromatic heterocyclic ring, of $A^x$, may have a plurality of aromatic rings, or have both an aromatic hydrocarbon ring and an aromatic heterocyclic ring.

Examples of the aromatic hydrocarbon ring may include a benzene ring, a naphthalene ring, and an anthracene ring. Examples of the aromatic heterocyclic ring may include a monocyclic aromatic heterocyclic ring, such as a pyrrole ring, a furan ring, a thiophene ring, a pyridine ring, a pyridazine ring, a pyrimidine ring, a pyrazine ring, a pyrazole ring, an imidazole ring, an oxazole ring, and a thiazole ring; and a fused aromatic heterocyclic ring, such as a benzothiazole ring, a benzoxazole ring, a quinoline ring, a phthalazine ring, a benzimidazole ring, a benzopyrazole ring, a benzofuran ring, a benzothiophene ring, a thiazolopyridine ring, an oxazolopyridine ring, a thiazolopyrazine ring, an oxazolopyrazine ring, a thiazolopyridazine ring, an oxazolopyridazine ring, a thiazolopyrimidine ring, and an oxazolopyrimidine ring.

The aromatic ring of $A^x$ may have a substituent. Examples of the substituent may include a halogen atom, such as a fluorine atom and a chlorine atom; a cyano group; an alkyl group of 1 to 6 carbon atoms, such as a methyl group, an ethyl group, and a propyl group; an alkenyl group of 2 to 6 carbon atoms, such as a vinyl group and an allyl group; a halogenated alkyl group of 1 to 6 carbon atoms, such as a trifluoromethyl group; a substituted amino group, such as a dimethylamino group; an alkoxy group of 1 to 6 carbon atoms, such as a methoxy group, an ethoxy group, and an isopropoxy group; a nitro group; an aryl group, such as a phenyl group and a naphthyl group; —C(=O)—$R^5$; —C(=O)—$OR^5$; and —$SO_2R^6$. Herein, $R^5$ is an alkyl group of 1 to 20 carbon atoms, an alkenyl group of 2 to 20 carbon atoms, or a cycloalkyl group of 3 to 12 carbon atoms. $R^6$ is an alkyl group of 1 to 20 carbon atoms, an alkenyl group of 2 to 20 carbon atoms, a phenyl group, or a 4-methylphenyl group, which are the same as those for $R^4$ which will be described later.

The aromatic ring of $A^x$ may have a plurality of substituents that may be the same or different, and two adjacent substituents may be bonded together to form a ring. The formed ring may be a monocycle or a fused polycycle, and may be an unsaturated ring or a saturated ring.

The "number of carbon atoms" in the organic group of 2 to 30 carbon atoms of $A^x$ means the total number of carbon atoms in the entire organic group which excludes carbon atoms in the substituents (the same applies to $A^y$ which will be described later).

Examples of the organic group of 2 to 30 carbon atoms having at least one aromatic ring selected from the group consisting of an aromatic hydrocarbon ring and an aromatic heterocyclic ring, of $A^x$, may include an aromatic hydrocarbon ring group; an aromatic heterocyclic group; an alkyl group of 3 to 30 carbon atoms having at least one aromatic ring selected from the group consisting of an aromatic hydrocarbon ring and an aromatic heterocyclic ring; an alkenyl group of 4 to 30 carbon atoms having at least one aromatic ring selected from the group consisting of an aromatic hydrocarbon ring and an aromatic heterocyclic ring; and an alkynyl group of 4 to 30 carbon atoms having at least one aromatic ring selected from the group consisting of an aromatic hydrocarbon ring and an aromatic heterocyclic ring.

Preferable specific examples of $A^x$ are as follows. However, $A^x$ is not limited to the following examples. In the following formulae, "-" represents an atomic bonding at any position of the ring (the same applies to the following).

(1) An Aromatic Hydrocarbon Ring Group

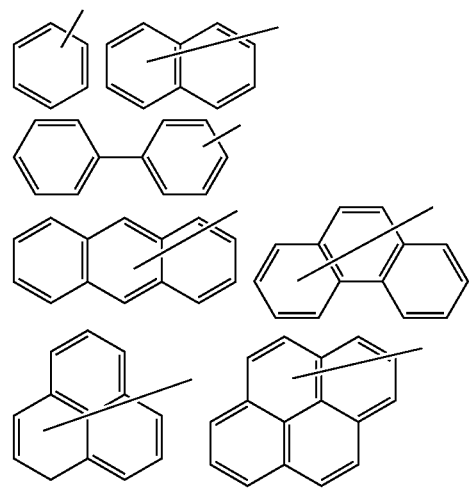

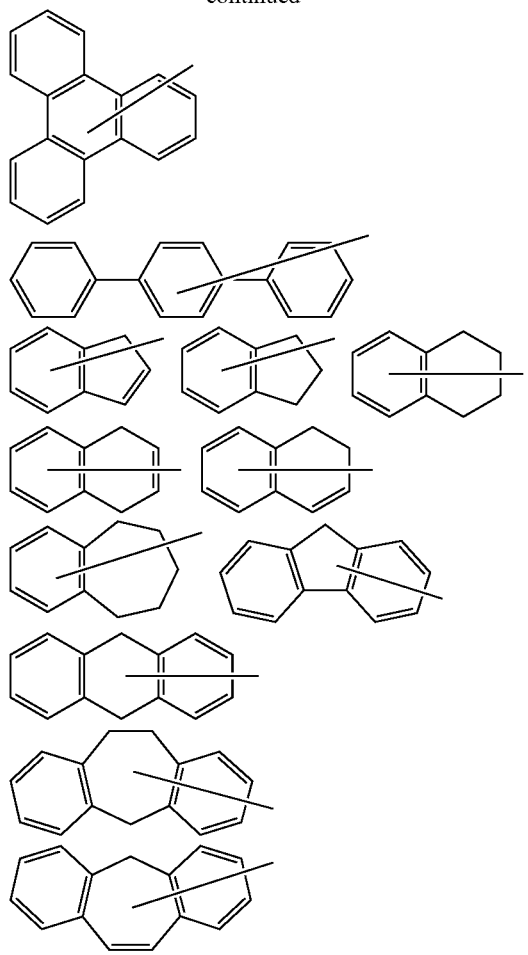

(2) An Aromatic Heterocyclic Group

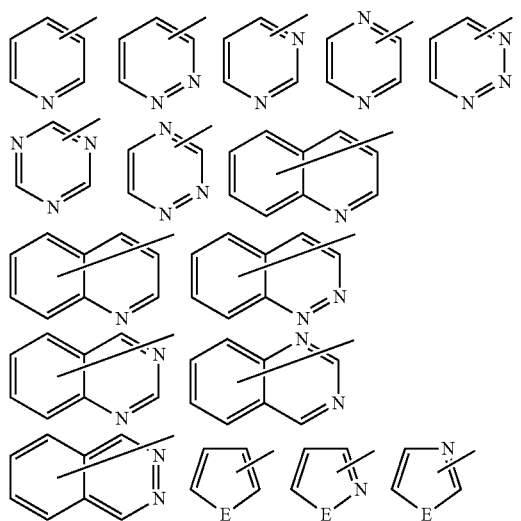

In the aforementioned formulae, E is $NR^{6a}$, an oxygen atom, or a sulfur atom. Herein, $R^{6a}$ is a hydrogen atom; or an alkyl group of 1 to 6 carbon atoms, such as a methyl group, an ethyl group, and a propyl group.

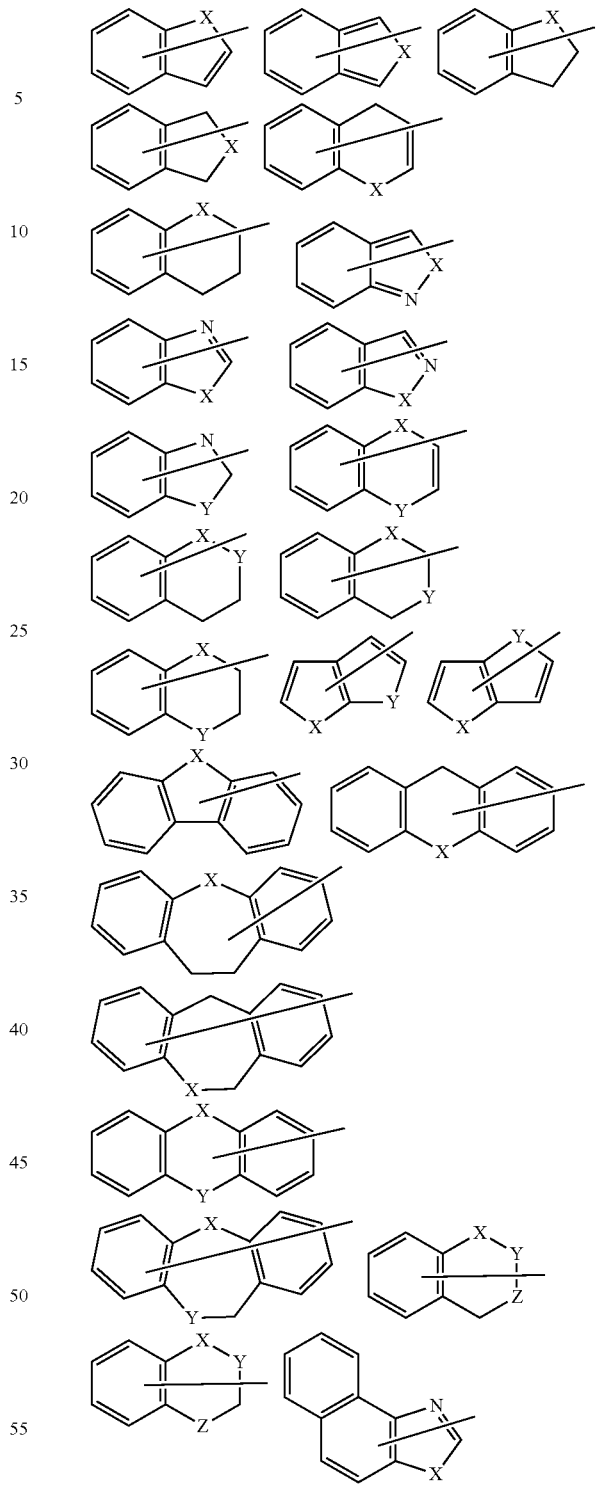

In the aforementioned formulae, X, Y, and Z are each independently $NR^7$, an oxygen atom, a sulfur atom, —SO—, or —SO$_2$— (with a proviso that cases where an oxygen atom, a sulfur atom, —SO—, and —SO$_2$— are each adjacent are excluded). $R^7$ is a hydrogen atom, or an alkyl group of 1 to 6 carbon atoms, such as a methyl group, an ethyl group, and a propyl group, which are the same as those for $R^{6a}$ described above.

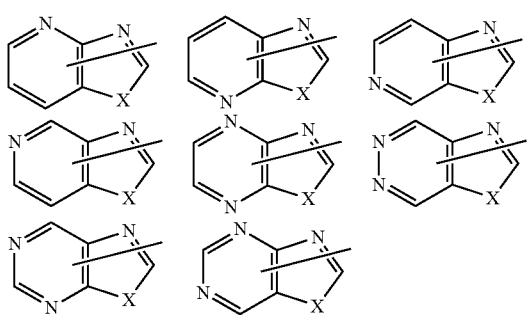

(In the aforementioned formulae, X has the same meanings as described above.)

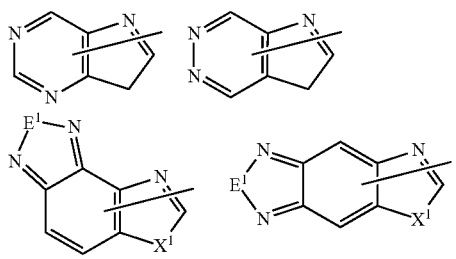

(In the aforementioned formulae, $X^1$ is —$CH_2$—, —$NR^c$—, an oxygen atom, a sulfur atom, —SO—, or —$SO_2$—, and E1 is —$NR^c$—, an oxygen atom or a sulfur atom. Herein, $R^c$ is a hydrogen atom, or an alkyl group of 1 to 6 carbon atoms such as a methyl group, an ethyl group, and a propyl group. (provided that, in each formula, each of the oxygen atom, the sulfur atom, —SO—, and —$SO_2$— is not adjacent.))

(3) An Alkyl Group Having at Least One Aromatic Ring Selected from the Group Consisting of an Aromatic Hydrocarbon Ring and an Aromatic Heterocyclic Ring

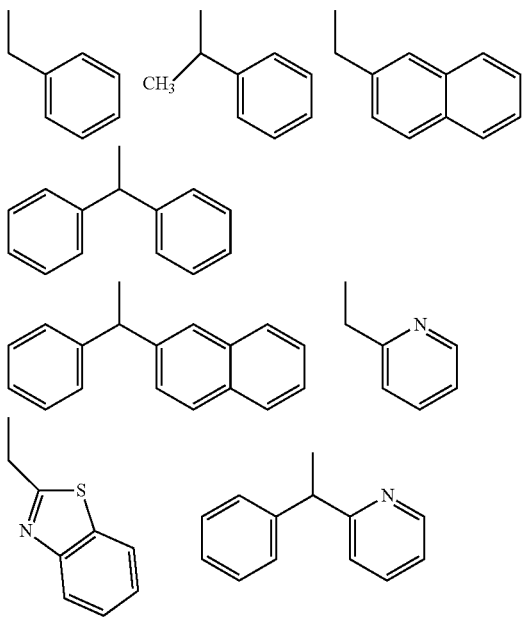

(4) An Alkenyl Group Having at Least One Aromatic Ring Selected from the Group Consisting of an Aromatic Hydrocarbon Ring and an Aromatic Heterocyclic Ring

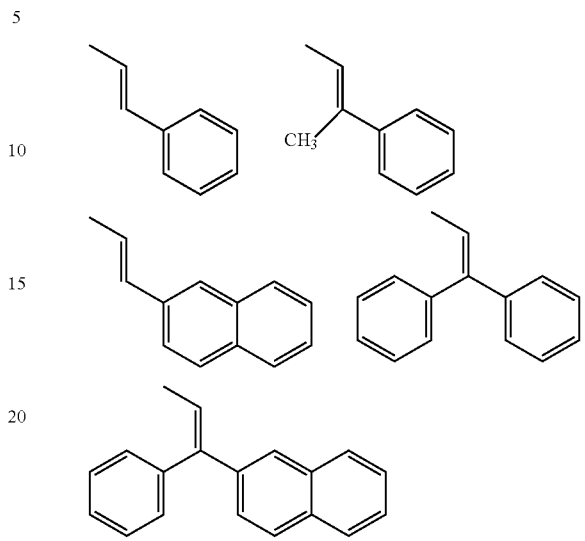

(5) An Alkynyl Group Having at Least One Aromatic Ring Selected from the Group Consisting of an Aromatic Hydrocarbon Ring and an Aromatic Heterocyclic Ring

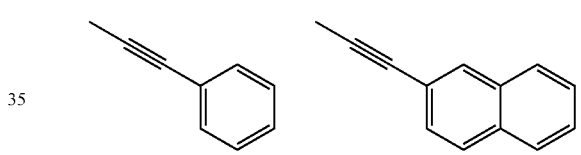

Of $A^x$ described above, an aromatic hydrocarbon ring group of 6 to 30 carbon atoms and an aromatic heterocyclic group of 4 to 30 carbon atoms are preferable, and any of the groups shown below are more preferable.

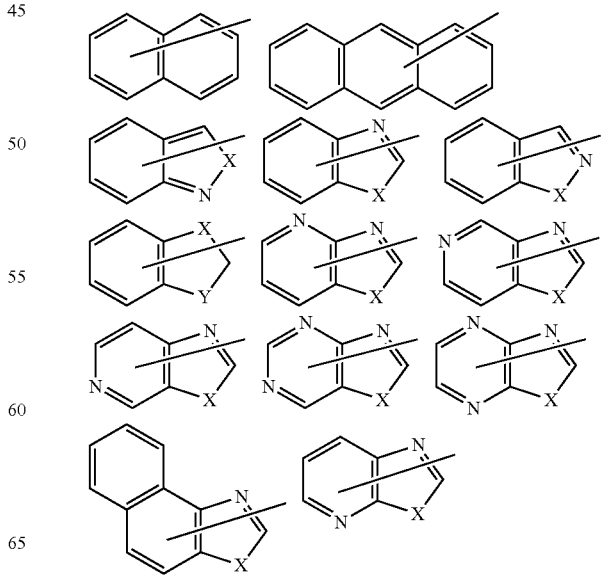

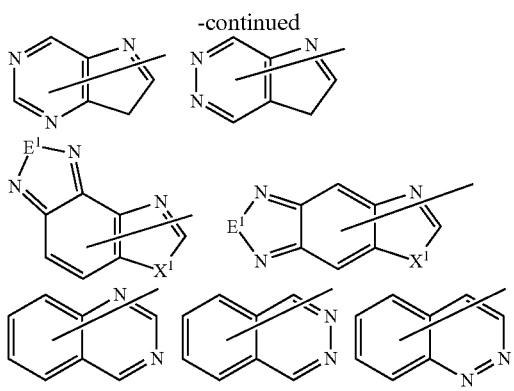

It is further preferable that $A^x$ is any of the following groups.

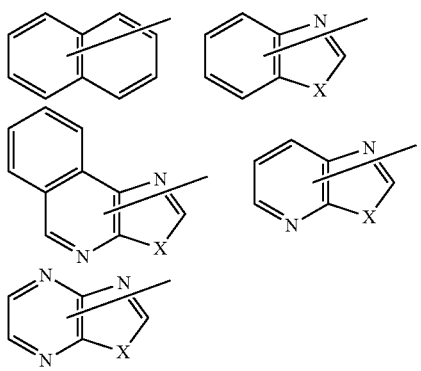

The ring that $A^x$ has may have a substituent. Examples of such a substituent may include a halogen atom, such as a fluorine atom and a chlorine atom; a cyano group; an alkyl group of 1 to 6 carbon atoms, such as a methyl group, an ethyl group, and a propyl group; an alkenyl group of 2 to 6 carbon atoms, such as a vinyl group and an allyl group; a halogenated alkyl group of 1 to 6 carbon atoms, such as a trifluoromethyl group; a substituted amino group, such as a dimethylamino group; an alkoxy group of 1 to 6 carbon atoms, such as a methoxy group, an ethoxy group, and an isopropoxy group; a nitro group; an aryl group, such as a phenyl group and a naphthyl group; —C(=O)—R$^8$; —C(=O)—OR$^8$; and —SO$_2$R$^6$. Herein, R$^8$ is an alkyl group of 1 to 6 carbon atoms, such as a methyl group and an ethyl group; or an aryl group of 6 to 14 carbon atoms, such as a phenyl group. In particular, it is preferable that the substituent is a halogen atom, a cyano group, an alkyl group of 1 to 6 carbon atoms, or an alkoxy group of 1 to 6 carbon atoms.

The ring that $A^x$ has may have a plurality of substituents that may be the same or different, and two adjacent substituents may be bonded together to form a ring. The formed ring may be a monocycle or a fused polycycle.

The "number of carbon atoms" in the organic group of 2 to 30 carbon atoms of $A^x$ means the total number of carbon atoms in the entire organic group which excludes carbon atoms in the substituents (the same applies to $A^y$ which will be described later).

In the aforementioned formula (I), $A^y$ is a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—R$^3$, —SO$_2$—R$^4$, —C(=S)NH—R$^9$, or an organic group of 2 to 30 carbon atoms having at least one aromatic ring selected from the group consisting of an aromatic hydrocarbon ring and an aromatic heterocyclic ring. Herein, R$^3$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms. R$^4$ is an alkyl group of 1 to 20 carbon atoms, an alkenyl group of 2 to 20 carbon atoms, a phenyl group, or a 4-methylphenyl group. R$^9$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent.

Examples of the alkyl group of 1 to 20 carbon atoms in the alkyl group of 1 to 20 carbon atoms optionally having a substituent, of $A^y$, may include a methyl group, an ethyl group, a n-propyl group, an isopropyl group, a n-butyl group, an isobutyl group, a 1-methylpentyl group, a 1-ethylpentyl group, a sec-butyl group, a t-butyl group, a n-pentyl group, an isopentyl group, a neopentyl group, a n-hexyl group, an isohexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, and a n-icosyl group. The number of carbon atoms in the alkyl group of 1 to 20 carbon atoms optionally having a substituent is preferably 1 to 12, and further preferably 4 to 10.

Examples of the alkenyl group of 2 to 20 carbon atoms in the alkenyl group of 2 to 20 carbon atoms optionally having a substituent, of $A^y$, may include a vinyl group, a propenyl group, an isopropenyl group, a butenyl group, an isobutenyl group, a pentenyl group, a hexenyl group, a heptenyl group, an octenyl group, a decenyl group, an undecenyl group, a dodecenyl group, a tridecenyl group, a tetradecenyl group, a pentadecenyl group, a hexadecenyl group, a heptadecenyl group, an octadecenyl group, a nonadecenyl group, and an icocenyl group. The number of carbon atoms in the alkenyl group of 2 to 20 carbon atoms optionally having a substituent is preferably 2 to 12.

Examples of the cycloalkyl group of 3 to 12 carbon atoms in the cycloalkyl group of 3 to 12 carbon atoms optionally having a substituent, of $A^y$, may include a cyclopropyl group, a cyclobutyl group, a cyclopentyl group, a cyclohexyl group, and a cyclooctyl group.

Examples of the alkynyl group of 2 to 20 carbon atoms in the alkynyl group of 2 to 20 carbon atoms optionally having a substituent, of $A^y$, may include an ethynyl group, a propynyl group, a 2-propynyl group (propargyl group), a butynyl group, a 2-butynyl group, a 3-butynyl group, a pentynyl group, a 2-pentynyl group, a hexynyl group, a 5-hexynyl group, a heptynyl group, an octynyl group, a 2-octynyl group, a nonanyl group, a decanyl group, and a 7-decanyl group.

Examples of the substituents in the alkyl group of 1 to 20 carbon atoms optionally having a substituent and the alkenyl group of 2 to 20 carbon atoms optionally having a substituent, of $A^y$, may include a halogen atom, such as a fluorine atom and a chlorine atom; a cyano group; a substituted amino group, such as a dimethylamino group; an alkoxy group of 1 to 20 carbon atoms, such as a methoxy group, an ethoxy group, an isopropyl group, and a butoxy group; an alkoxy group of 1 to 12 carbon atoms that is substituted by an alkoxy group of 1 to 12 carbon atoms, such as a methoxymethoxy group and a methoxyethoxy group; a nitro group; an aryl group, such as a phenyl group and a naphthyl group; a cycloalkyl group of 3 to 8 carbon atoms, such as a cyclopropyl group, a cyclopentyl group, and a cyclohexyl group; a cycloalkyloxy group of 3 to 8 carbon atoms, such as a cyclopentyloxy group, and a cyclohexyloxy group; a cyclic ether group of 2 to 12 carbon atoms, such as a tetrahydrofuranyl group, a tetrahydropyranyl group, a dioxolanyl group, and a dioxanyl group; an aryloxy group of 6 to 14 carbon atoms, such as a phenoxy group, and a naphthoxy group; a fluoroalkoxy group of 1 to 12 carbon atoms in which at least one is substituted by a fluoro atom, such as a trifluoromethyl group, a pentafluoroethyl group, and —$CH_2CF_3$; a benzofuryl group; a benzopyranyl group; a benzodioxolyl group; a benzodioxanyl group; —C(=O)—$R^{7a}$; —C(=O)—$OR^{7a}$; —$SO_2R^{8a}$; —$SR^{10}$; an alkoxy group of 1 to 12 carbon atoms substituted by —$SR^{10}$; and a hydroxyl group. Herein, $R^{7a}$ and $R^{10}$ are each independently an alkyl group of 1 to 20 carbon atoms, an alkenyl group of 2 to 20 carbon atoms, a cycloalkyl group of 3 to 12 carbon atoms, or an aromatic hydrocarbon ring group of 6 to 12 carbon atoms. $R^{8a}$ is an alkyl group of 1 to 20 carbon atoms, an alkenyl group of 2 to 20 carbon atoms, a phenyl group, or a 4-methylphenyl group, which are the same as those for $R^4$ described above.

Examples of the substituent in the cycloalkyl group of 3 to 12 carbon atoms optionally having a substituent, of $A^y$, may include a halogen atom, such as a fluorine atom and a chlorine atom; a cyano group; a substituted amino group, such as a dimethylamino group; an alkyl group of 1 to 6 carbon atoms, such as a methyl group, an ethyl group, and a propyl group; an alkoxy group of 1 to 6 carbon atoms, such as a methoxy group, an ethoxy group, and an isopropoxy group; a nitro group; an aryl group, such as a phenyl group and a naphthyl group; a cycloalkyl group of 3 to 8 carbon atoms, such as a cyclopropyl group, a cyclopentyl group, and a cyclohexyl group; —C(=O)—$R^{7a}$; —C(=O)—$OR^{7a}$; —$SO_2R^{8a}$; and a hydroxyl group. Herein, $R^{7a}$ and $R^{8a}$ have the same meanings as described above.

Examples of the substituent in the alkynyl group of 2 to 20 carbon atoms optionally having a substituent, of $A^y$, may include substituents that are the same as the substituents in the alkyl group of 1 to 20 carbon atoms optionally having a substituent and the alkenyl group of 2 to 20 carbon atoms optionally having a substituent.

In the group represented by —C(=O)—$R^3$ of $A^y$, $R^3$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms. Specific examples thereof may include those exemplified as the examples of the alkyl group of 1 to 20 carbon atoms optionally having a substituent, the alkenyl group of 2 to 20 carbon atoms optionally having a substituent, and the cycloalkyl group of 3 to 12 carbon atoms optionally having a substituent, of $A^y$; and the aromatic hydrocarbon ring group of 5 to 12 carbon atoms, among the aromatic hydrocarbon ring groups described in $A^x$ described above.

In the group represented by —$SO_2$—$R^4$ of $A^y$, $R^4$ is an alkyl group of 1 to 20 carbon atoms, an alkenyl group of 2 to 20 carbon atoms, a phenyl group, or a 4-methylphenyl group. Specific examples of the alkyl group of 1 to 20 carbon atoms and the alkenyl group of 2 to 20 carbon atoms, of $R^4$, may include those exemplified as the examples of the alkyl group of 1 to 20 carbon atoms, and the alkenyl group of 2 to 20 carbon atoms, of $A^y$ described above.

In the group represented by —C(=S)NH—$R^9$ of $A^y$, $R^9$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent. Specific examples thereof may include those exemplified as the examples of the alkyl group of 1 to 20 carbon atoms optionally having a substituent, the alkenyl group of 2 to 20 carbon atoms optionally having a substituent, and the cycloalkyl group of 3 to 12 carbon atoms optionally having a substituent, of $A^y$ described above; and the aromatic hydrocarbon ring group of 5 to 20 carbon atoms and aromatic heteroaromatic ring group of 5 to 20 carbon atoms, among the aromatic hydrocarbon ring groups and aromatic heteroaromatic ring groups described in $A^x$ described above.

Examples of the organic group of 2 to 30 carbon atoms having at least one aromatic ring selected from the group consisting of an aromatic hydrocarbon ring and an aromatic heterocyclic ring of $A^y$ may include those exemplified as the examples of $A^x$ described above.

Among these, $A^y$ is preferably a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—$R^3$, —$SO_2$—$R^4$, or an organic group of 2 to 30 carbon atoms having at least one aromatic ring selected from the group consisting of an aromatic hydrocarbon ring and an aromatic heterocyclic ring, and further preferably a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, an aromatic hydrocarbon ring group of 6 to 12 carbon atoms optionally having a substituent, an aromatic heterocyclic group of 3 to 9 carbon atoms optionally having a substituent, —C(=O)—$R^3$, or a group represented by —$SO_2$—$R^4$. Herein, $R^3$ and $R^4$ have the same meanings as described above.

It is preferable that substituents in the alkyl group of 1 to 20 carbon atoms optionally having a substituent, the alkenyl group of 2 to 20 carbon atoms optionally having a substituent, and the alkynyl group of 2 to 20 carbon atoms optionally having a substituent, of $A^y$, are a halogen atom, a cyano group, an alkoxy group of 1 to 20 carbon atoms, an alkoxy group of 1 to 12 carbon atoms that is substituted by an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a phenylsulfonyl group, a 4-methylphenylsulfonyl group, a benzoyl group, or —$SR^{10}$. Herein, $R^{10}$ has the same meanings as described above.

It is preferable that substituents in the cycloalkyl group of 3 to 12 carbon atoms optionally having a substituent, the aromatic hydrocarbon ring group of 6 to 12 carbon atoms optionally having a substituent, and the aromatic heterocyclic group of 3 to 9 carbon atoms optionally having a substituent, of $A^y$, are a fluorine atom, an alkyl group of 1 to 6 carbon atoms, an alkoxy group of 1 to 6 carbon atoms, or a cyano group.

$A^x$ and $A^y$ may form a ring together. Examples of the ring may include an unsaturated heterocyclic ring of 4 to 30 carbon atoms optionally having a substituent and an unsaturated carbon ring of 6 to 30 carbon atoms optionally having a substituent.

The aforementioned unsaturated heterocyclic ring of 4 to 30 carbon atoms and the aforementioned unsaturated carbon ring of 6 to 30 carbon atoms are not particularly restricted, and may or may not have aromaticity.

Examples of the ring formed by $A^x$ and $A^y$ together may include rings shown below. The rings shown below are a moiety of:

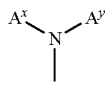

in the formula (I).

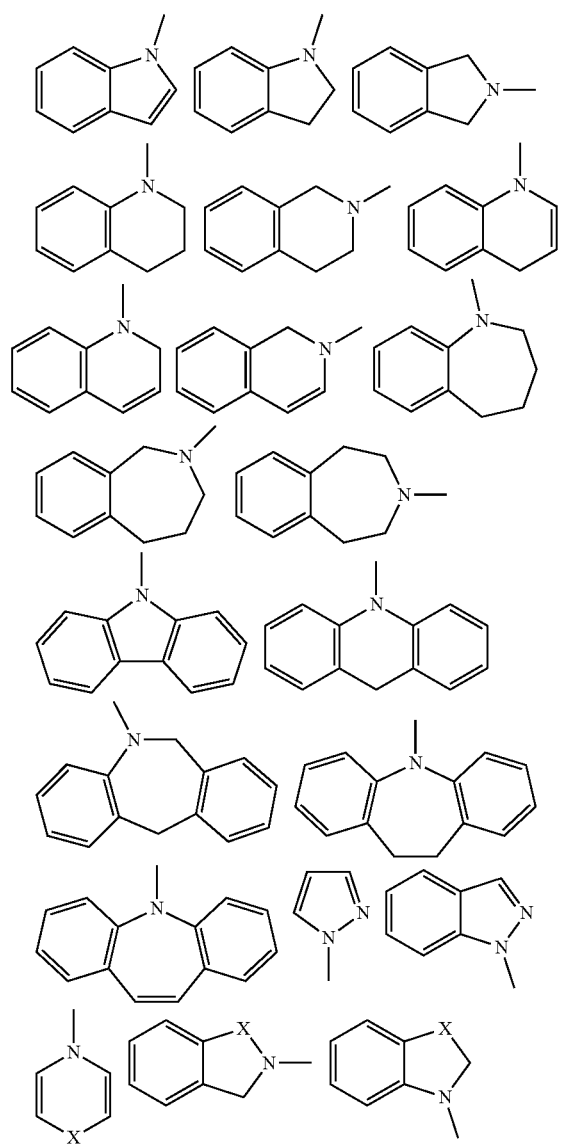

-continued

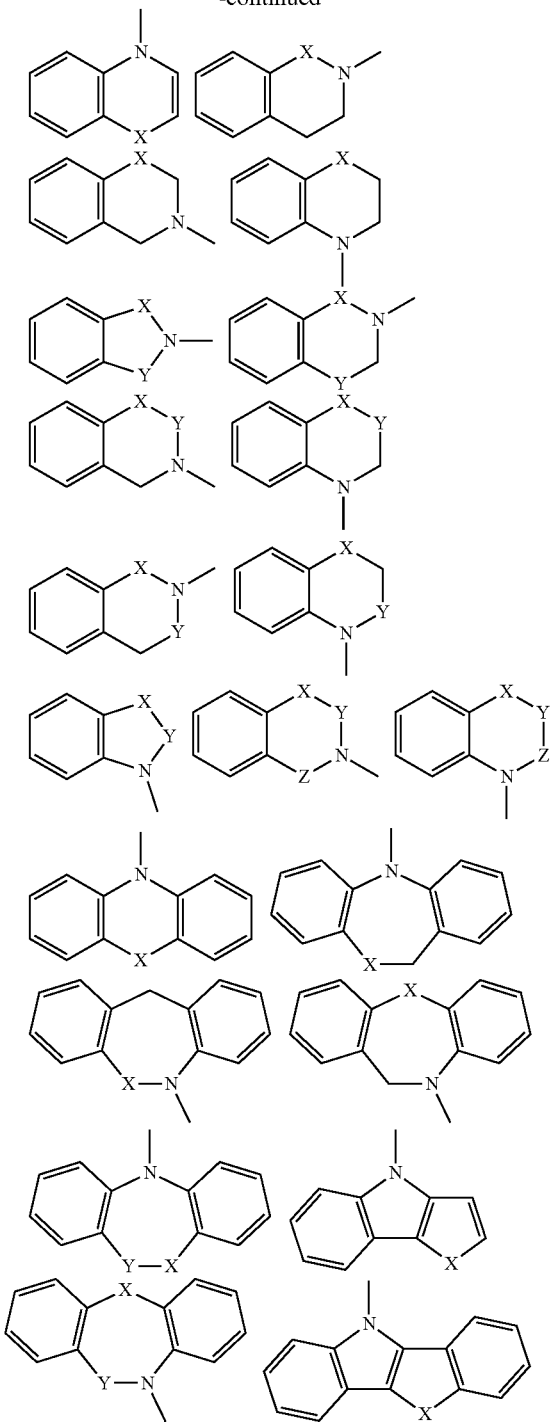

(In the formulae, X, Y, and Z have the same meanings as described above.)

The rings may have a substituent. Examples of the substituent may include those described as the substituent in the aromatic ring of $A^x$.

The total number of π electrons contained in $A^x$ and $A^y$ is preferably 4 or more and more preferably 6 or more, and preferably 24 or less, more preferably 20 or less and particularly preferably 18 or less from the viewpoint of favorably expressing the desired effect of the present invention.

Examples of preferred combination of $A^x$ and $A^y$ may include the following combinations (α) and (β).

(α) a combination of $A^x$ and $A^y$ in which $A^x$ is an aromatic hydrocarbon ring group of 4 to 30 carbon atoms or an aromatic heterocyclic group of 4 to 30 carbon atoms, $A^y$ is a hydrogen atom, a cycloalkyl group of 3 to 8 carbon atoms, an aromatic hydrocarbon ring group of 6 to 12 carbon atoms optionally having a substituent (a halogen atom, a cyano group, an alkyl group of 1 to 6 carbon atoms, an alkoxy group of 1 to 6 carbon atoms, or a cycloalkyl group of 3 to 8 carbon atoms), an aromatic heterocyclic group of 3 to 9 carbon atoms optionally having a substituent (a halogen atom, an alkyl group of 1 to 6 carbon atoms, an alkoxy group of 1 to 6 carbon atoms, or a cyano group), an alkyl group of 1 to 20 carbon atoms optionally having a substituent, an alkenyl group of 1 to 20 carbon atoms optionally having a substituent, or an alkynyl group of 2 to 20 carbon atoms optionally having a substituent, and the substituent is any of a halogen atom, a cyano group, an alkoxy group of 1 to 20 carbon atoms, an alkoxy group of 1 to 12 carbon atoms that is substituted by an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a benzenesulfonyl group, a benzoyl group, and $-SR^{10}$.

(β) a combination of $A^x$ and $A^y$ in which $A^x$ and $A^y$ together form an unsaturated heterocyclic ring or an unsaturated carbon ring.

Herein, $R^{10}$ has the same meanings as described above.

Examples of more preferred combination of $A^x$ and $A^y$ may include the following combination (γ).

(γ) a combination of $A^x$ and $A^y$ in which $A^x$ is any of groups having the following structures, $A^y$ is a hydrogen atom, a cycloalkyl group of 3 to 8 carbon atoms, an aromatic hydrocarbon ring group of 6 to 12 carbon atoms optionally having a substituent (a halogen atom, a cyano group, an alkyl group of 1 to 6 carbon atoms, an alkoxy group of 1 to 6 carbon atoms, or a cycloalkyl group of 3 to 8 carbon atoms), an aromatic heterocyclic group of 3 to 9 carbon atoms optionally having a substituent (a halogen atom, an alkyl group of 1 to 6 carbon atoms, an alkoxy group of 1 to 6 carbon atoms, or a cyano group), an alkyl group of 1 to 20 carbon atoms optionally having a substituent, an alkenyl group of 1 to 20 carbon atoms optionally having a substituent, or an alkynyl group of 2 to 20 carbon atoms optionally having a substituent, and the substituent is any of a halogen atom, a cyano group, an alkoxy group of 1 to 20 carbon atoms, an alkoxy group of 1 to 12 carbon atoms that is substituted by an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a benzenesulfonyl group, a benzoyl group, and $-SR^{10}$. Herein, $R^{10}$ has the same meanings as described above.

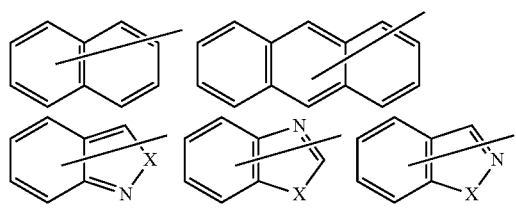

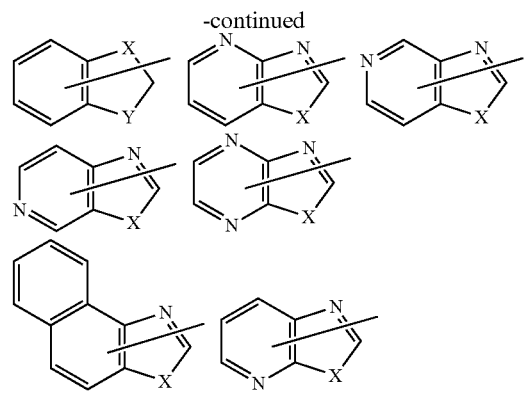

(In the formulae, X and Y have the same meanings as described above.)

Examples of particularly preferred combination of $A^x$ and $A^y$ may include the following combination (δ).

(δ) a combination of $A^x$ and $A^y$ in which $A^x$ is any of groups having the following structures, $A^y$ is a hydrogen atom, a cycloalkyl group of 3 to 8 carbon atoms, an aromatic hydrocarbon ring group of 6 to 12 carbon atoms optionally having a substituent (a halogen atom, a cyano group, an alkyl group of 1 to 6 carbon atoms, an alkoxy group of 1 to 6 carbon atoms, or a cycloalkyl group of 3 to 8 carbon atoms), an aromatic heterocyclic group of 3 to 9 carbon atoms optionally having a substituent (a halogen atom, an alkyl group of 1 to 6 carbon atoms, an alkoxy group of 1 to 6 carbon atoms, or a cyano group), an alkyl group of 1 to 20 carbon atoms optionally having a substituent, an alkenyl group of 1 to 20 carbon atoms optionally having a substituent, or an alkynyl group of 2 to 20 carbon atoms optionally having a substituent, and the substituent is any of a halogen atom, a cyano group, an alkoxy group of 1 to 20 carbon atoms, an alkoxy group of 1 to 12 carbon atoms that is substituted by an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a benzenesulfonyl group, a benzoyl group, and $-SR^{10}$. In the following formulae, X has the same meanings as described above. Herein, $R^{10}$ has the same meanings as described above.

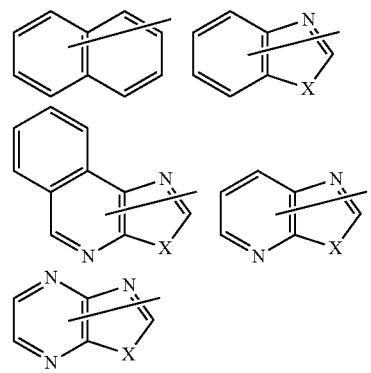

In the formula (I) mentioned above, $A^1$ is a trivalent aromatic group optionally having a substituent. The trivalent aromatic group may be a trivalent carbocyclic aromatic group or a trivalent heterocyclic aromatic group. From the viewpoint of favorably expressing the desired effect of the present invention, the trivalent aromatic group is preferably the trivalent carbocyclic aromatic group, more preferably a trivalent benzene ring group or a trivalent naphthalene ring group, and further preferably a trivalent benzene ring group or a trivalent naphthalene ring group that is represented by the following formula. In the following formulae, substituents $Y^1$ and $Y^2$ are described for the sake of convenience to clearly show a bonding state ($Y^1$ and $Y^2$ have the same meanings as described above, and the same applies to the following).

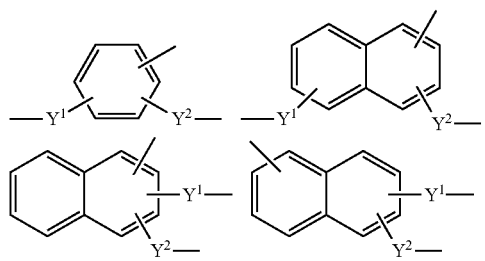

Among these, $A^1$ is more preferably a group represented by each of the following formulae (A11) to (A25), further preferably a group represented by the formula (A11), (A13), (A15), (A19), or (A23), and particularly preferably a group represented by the formula (A11) or (A23).

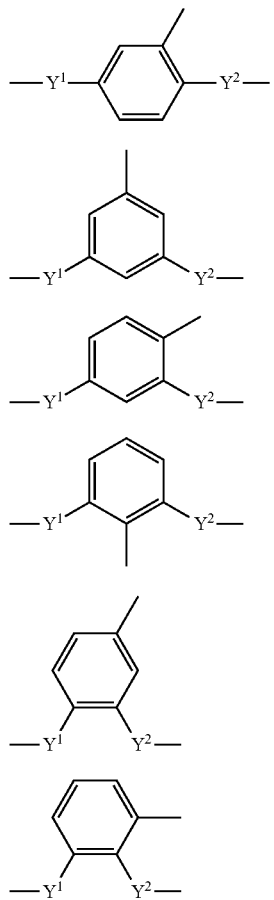

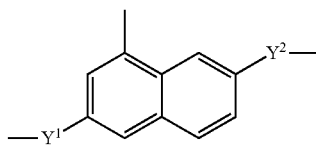

(A17)

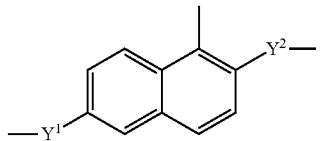

(A18)

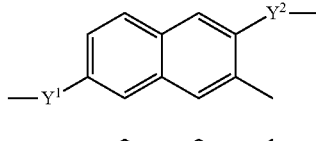

(A19)

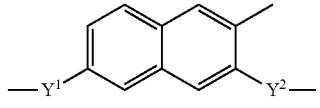

(A20)

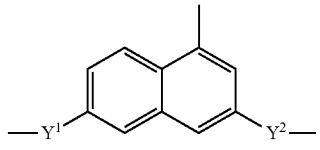

(A21)

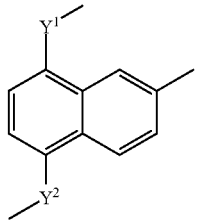

(A22)

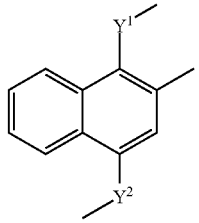

(A23)

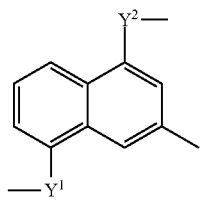

(A24)

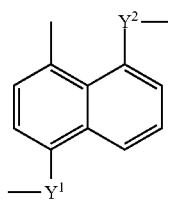

(A25)

Examples of the substituent that may be included in the trivalent aromatic group of $A^1$ may include those described as the substituent in the aromatic ring of $A^x$ described above. It is preferable that $A^1$ is a trivalent aromatic group having no substituent.

In the formula (I) mentioned above, $A^2$ and $A^3$ are each independently a divalent alicyclic hydrocarbon group of 3 to 30 carbon atoms optionally having a substituent. Examples of the divalent alicyclic hydrocarbon group of 3 to 30 carbon atoms may include a cycloalkanediyl group of 3 to 30 carbon atoms, and a divalent alicyclic fused ring group of 10 to 30 carbon atoms.

Examples of the cycloalkanediyl group of 3 to 30 carbon atoms may include a cyclopropanediyl group; a cyclobutanediyl group, such as a cyclobutane-1,2-diyl group and a cyclobutane-1,3-diyl group; a cyclopentanediyl group, such as a cyclopentane-1,2-diyl group and a cyclopentane-1,3-diyl group; a cyclohexanediyl group, such as a cyclohexane-1,2-diyl group, a cyclohexane-1,3-diyl group, and a cyclohexane-1,4-diyl group; a cycloheptanediyl group, such as a cycloheptane-1,2-diyl group, a cycloheptane-1,3-diyl group, and a cycloheptane-1,4-diyl group; a cyclooctanediyl group, such as a cyclooctane-1,2-diyl group, a cyclooctane-1,3-diyl group, a cyclooctane-1,4-diyl group, and a cyclooctane-1,5-diyl group; a cyclodecanediyl group, such as a cyclodecane-1,2-diyl group, a cyclodecane-1,3-diyl group, a cyclodecane-1,4-diyl group, and a cyclodecane-1,5-diyl group; a cyclododecanediyl group, such as a cyclododecane-1,2-diyl group, a cyclododecane-1,3-diyl group, a cyclododecane-1,4-diyl group, and a cyclododecane-1,5-diyl group; a cyclotetradecanediyl group, such as a cyclotetradecane-1,2-diyl group, a cyclotetradecane-1,3-diyl group, a cyclotetradecane-1,4-diyl group, a cyclotetradecane-1,5-diyl group, and a cyclotetradecane-1,7-diyl group; and a cycloeicosanediyl group, such as a cycloeicosane-1,2-diyl group and a cycloeicosane-1,10-diyl group.

Examples of the divalent alicyclic fused ring group of 10 to 30 carbon atoms may include a decalindiyl group, such as a decalin-2,5-diyl group and a decalin-2,7-diyl group; an adamantanediyl group, such as an adamantane-1,2-diyl group and an adamantane-1,3-diyl group; and a bicyclo[2.2.1]heptanediyl group, such as a bicyclo[2.2.1]heptane-2,3-diyl group, a bicyclo[2.2.1]heptane-2,5-diyl group, and a bicyclo[2.2.1]heptane-2,6-diyl group.

The divalent alicyclic hydrocarbon groups may further have a substituent at any position. Examples of the substituent may include those described as the substituent in the aromatic ring of $A^x$ described above.

Among these, $A^2$ and $A^3$ are preferably a divalent alicyclic hydrocarbon group of 3 to 12 carbon atoms, more preferably a cycloalkanediyl group of 3 to 12 carbon atoms, further preferably a group represented by each of the following formulae (A31) to (A34), and particularly preferably the group represented by the following formula (A32).

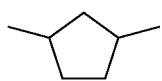

(A31)

(A32)

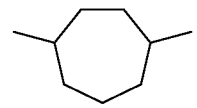

(A33)

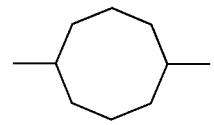

(A34)

The divalent alicyclic hydrocarbon group of 3 to 30 carbon atoms may exist in forms of cis- and trans-stereoisomers that are on the basis of difference of stereoconfiguration of carbon atoms bonded to $Y^1$ and $Y^3$ (or $Y^2$ and $Y^4$). For example, when the group is a cyclohexane-1,4-diyl group, a cis-isomer (A32a) and a trans-isomer (A32b) may exist, as described below.

(A32a)

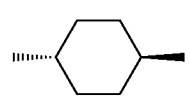

(A32b)

The aforementioned divalent alicyclic hydrocarbon group of 3 to 30 carbon atoms may be a cis-isomer, a trans-isomer, or an isomeric mixture of cis- and trans-isomers. Since the orientation quality is favorable, the group is preferably the trans-isomer or the cis-isomer, and more preferably the trans-isomer.

In the formula (I) mentioned above, $A^4$ and $A^5$ are each independently a divalent aromatic group of 6 to 30 carbon atoms optionally having a substituent. The aromatic group of $A^4$ and $A^5$ may be monocyclic or polycyclic. Specific preferable examples of $A^4$ and $A^5$ are as follows.

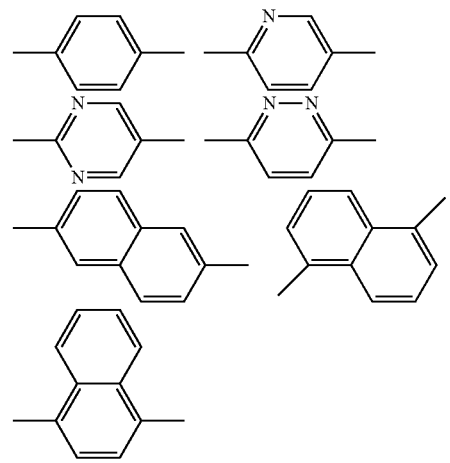

The divalent aromatic groups of $A^4$ and $A^5$ described above may have a substituent at any position. Examples of the substituent may include a halogen atom, a cyano group, a hydroxyl group, an alkyl group of 1 to 6 carbon atoms, an alkoxy group of 1 to 6 carbon atoms, a nitro group, and a —C(=O)—ORb group. Herein, $R^{8b}$ is an alkyl group of 1 to 6 carbon atoms. In particular, it is preferable that the substituent is a halogen atom, an alkyl group of 1 to 6 carbon atoms, or an alkoxy group. Of the halogen atoms, a fluorine atom is more preferable, of the alkyl groups of 1 to 6 carbon atoms, a methyl group, an ethyl group, and a propyl group are more preferable, and of the alkoxy groups, a methoxy group and an ethoxy group are more preferable.

Among these, from the viewpoint of favorably expressing the desired effect of the present invention, $A^4$ and $A^5$ are each independently preferably a group represented by the following formula (A41), (A42), or (A43) and optionally having a substituent, and particularly preferably the group represented by the formula (A41) and optionally having a substituent.

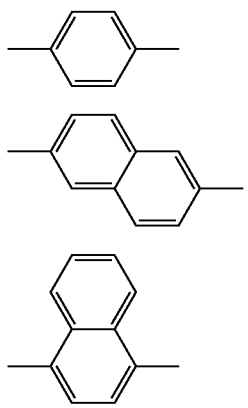

In the formula (I) mentioned above, $Q^1$ is a hydrogen atom or an alkyl group of 1 to 6 carbon atoms optionally having a substituent. Examples of the alkyl group of 1 to 6 carbon atoms optionally having a substituent may include the alkyl group of 1 to 6 carbon atoms among the alkyl groups of 1 to 20 carbon atoms optionally having a substituent that are described as $A^y$ described above. Among these, $Q^1$ is preferably a hydrogen atom or an alkyl group of 1 to 6 carbon atoms, and more preferably a hydrogen atom or a methyl group.

In the formula (I) mentioned above, m and n are each independently 0 or 1. Among these, m is preferably 1, and n is preferably 1.

The compound (I) may be produced, for example, by the following reaction.

(In the formula, $Y^1$ to $Y^8$, $G^1$, $G^2$, $Z^1$, $Z^2$, $A^x$, $A^y$, $A^1$ to $A5$, $Q^1$, m, and n have the same meanings as described above.)

As shown in the aforementioned reaction formula, the compound (I) may be produced by a reaction of a hydrazine compound represented by a formula (3) with a carbonyl compound represented by a formula (4). Hereinafter, the hydrazine compound represented by the formula (3) may be appropriately referred to as "hydrazine compound (3)". The carbonyl compound represented by the formula (4) may be appropriately referred to as "carbonyl compound (4)".

In the aforementioned reaction, the molar ratio of "the hydrazine compound (3):the carbonyl compound (4)" is preferably 1:2 to 2:1, and more preferably 1:1.5 to 1.5:1. When the compounds are reacted at such a molar ratio, the compound (I) as a target can be highly selectively produced in high yield.

In this case, the reaction system may include an acid catalyst including an organic acid, such as (±)-10-camphor-sulfonic acid and p-toluene sulfonic acid; and an inorganic acid, such as hydrochloric acid and sulfuric acid. When the acid catalyst is used, the reaction time may be shortened, and the yield may be improved. The amount of the acid catalyst is usually 0.001 mol to 1 mol relative to 1 mol of the carbonyl compound (4). The acid catalyst as it is may be mixed in the reaction system. Alternatively, the acid catalyst to be mixed may be in a solution form in which the acid catalyst is dissolved in an appropriate solution.

As the solvent for use in the reaction, a solvent inert to the reaction may be used. Examples of the solvent may include an alcohol-based solvent, such as methyl alcohol, ethyl alcohol, n-propyl alcohol, isopropyl alcohol, n-butyl alcohol, isobutyl alcohol, sec-butyl alcohol, and t-butyl alcohol; an ether-based solvent, such as diethyl ether, tetrahydrofuran, 1,2-dimethoxyethane, 1,4-dioxane, and cyclopentyl methyl ether; an ester-based solvent, such as ethyl acetate, propyl acetate, and methyl propionate; an aromatic hydrocarbon-based solvent, such as benzene, toluene, and xylene; an aliphatic hydrocarbon-based solvent, such as n-pentane, n-hexane, and n-heptane; an amide-based solvent, such as N,N-dimethylformamide, N-methylpyrrolidone, and hexamethylphosphoric triamide; a sulfur-containing solvent, such as dimethylsulfoxide, and sulfolane; and a mixed solvent of two or more types thereof. Among these, the alcohol-based solvent, the ether-based solvent, and a mixed solvent of the alcohol-based solvent and the ether-based solvent are preferable.

The amount of the solvent used is not particularly limited, and may be determined in consideration of type of compound to be used, reaction scale, and the like. The specific

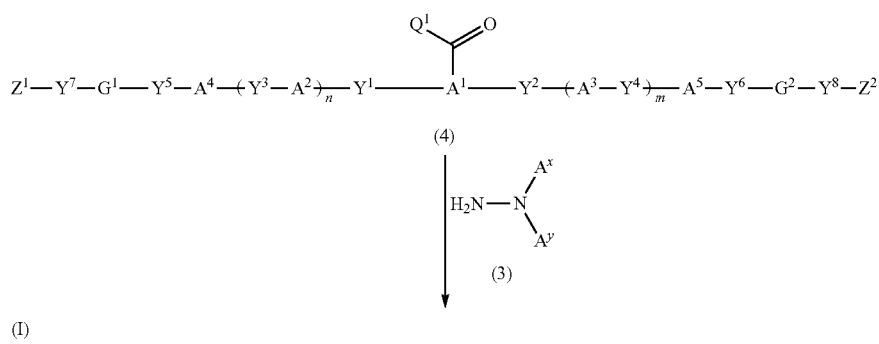

amount of the solvent used is usually 1 g to 100 g relative to 1 g of the hydrazine compound (3).

The reaction can smoothly proceed in a temperature range that is usually −10° C. or higher and equal to or lower than the boiling point of the solvent used. The reaction time of each reaction may vary depending on the reaction scale, and is usually several minutes to several hours.

The hydrazine compound (3) may be produced as follows.

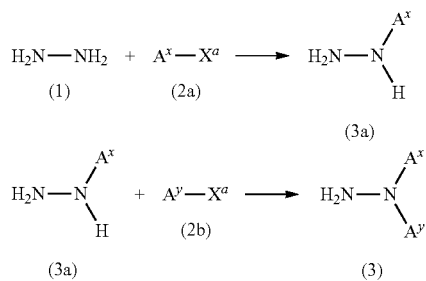

(wherein, $A^x$ and $A^y$ have the same meanings as described above, and $X^a$ is a leaving group, such as a halogen atom, a methanesulfonyloxy group, and a p-toluenesulfonyloxy group.)

As shown in the aforementioned reaction formula, a corresponding hydrazine compound (3a) can be obtained by a reaction of a compound represented by a formula (2a) with hydrazine (1) in an appropriate solvent. In this reaction, the molar ratio of "the compound (2a):the hydrazine (1)" is preferably 1:1 to 1:20, and more preferably 1:2 to 1:10. Further, the hydrazine compound (3a) can be reacted with a compound represented by a formula (2b) to obtain the hydrazine compound (3).

As hydrazine (1), hydrazine monohydrate may be usually used. As hydrazine (1), a commercially available product as it is may be used.

As the solvent for use in this reaction, a solvent inert to the reaction may be used. Examples of the solvent may include an alcohol-based solvent, such as methyl alcohol, ethyl alcohol, n-propyl alcohol, isopropyl alcohol, n-butyl alcohol, isobutyl alcohol, sec-butyl alcohol, and t-butyl alcohol; an ether-based solvent, such as diethyl ether, tetrahydrofuran, 1,2-dimethoxyethane, 1,4-dioxane, and cyclopentyl methyl ether; an aromatic hydrocarbon-based solvent, such as benzene, toluene, and xylene; an aliphatic hydrocarbon-based solvent, such as n-pentane, n-hexane, and n-heptane; an amide-based solvent, such as N,N-dimethylformamide, N-methylpyrrolidone, and hexamethylphosphoric triamide; a sulfur-containing solvent, such as dimethylsulfoxide, and sulfolane; and a mixed solvent of two or more types thereof. Among these, the alcohol-based solvent, the ether-based solvent, and a mixed solvent of the alcohol-based solvent and the ether-based solvent are preferable.

The amount of the solvent used is not particularly limited, and may be determined in consideration of type of compound to be used, reaction scale, and the like. For example, the specific amount of the solvent used is usually 1 g to 100 g relative to 1 g of hydrazine.

The reaction can smoothly proceed in a temperature range that is usually −10° C. or higher and equal to or lower than the boiling point of the solvent used. The reaction time of each reaction may vary depending on the reaction scale, and is usually several minutes to several hours.

The hydrazine compound (3) may also be produced by reducing a diazonium salt (5) through a known method, as described below.

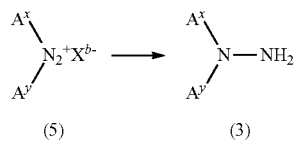

In the formula (5), $A^x$ and $A^y$ have the same meanings as described above, and $X^{b-}$ is an anion that is a counter ion of diazonium. Examples of $X^{b-}$ may include an inorganic anion, such as a hexafluorophosphate ion, a fluoroborate ion, a chloride ion, and a sulfate ion; and an organic anion, such as a polyfluoroalkylcarbonate ion, a polyfluoroalkylsulfonate ion, a tetraphenylborate ion, an aromatic carboxylate ion, and an aromatic sulfonate ion.

Examples of the reducing agent used in the aforementioned reaction may include a metal salt reducing agent. The metal salt reducing agent is generally a compound containing low-valent metal or a compound composed of a metal ion and a hydride source (see "Yuki Gosei Jikkenhou Handbook (Organic synthesis experimental method handbook)", 1990, edited by The Society of Synthetic Organic Chemistry, Japan, published by Maruzen Co., Ltd., p. 810).

Examples of the metal salt reducing agent may include $NaAlH_4$, $NaAlH_p(Or)_q$ (wherein p and q are each independently an integer of 1 to 3, p+q=4, and r is an alkyl group of 1 to 6 carbon atoms), $LiAlH_4$, $iBu_2AlH$, $LiBH_4$, $NaBH_4$, $SnCl_2$, $CrCl_2$, and $TiCl_3$. Herein, "iBu" represents an isobutyl group.

In the reduction reaction, a known reaction condition may be adopted. For example, the reaction may be performed under conditions described in documents including Japanese Patent Application Laid-Open No. 2005-336103 A, Shin Jikken Kagaku Koza (New course of experimental chemistry), 1978, published by Maruzen Co., Ltd., vol. 14, and Jikken Kagaku Koza (Course of experimental chemistry), 1992, published by Maruzen Co., Ltd., vol. 20. The diazonium salt (5) may be produced from a compound such as aniline by an ordinary method.

The carbonyl compound (4) may be produced, for example, by appropriately bonding and modifying a plurality of known compounds having a desired structure through any combination of reactions of forming an ether linkage (—O—), an ester linkage (—C(=O)—O— and —O—C (=O)—), a carbonate linkage (—O—C(=O)—O—), and an amide linkage (—C(=O)NH— and —NH—C(=O)—).

An ether linkage may be formed as follows.

(i) A compound represented by a formula: D1-hal (hal is a halogen atom, and the same applies to the following) and a compound represented by a formula: D2-OMet (Met is an alkaline metal (mainly sodium), and the same applies to the following) are mixed and condensed (Williamson synthesis). In the formulae, D1 and D2 are an optional organic group (the same applies to the following).

(ii) A compound represented by a formula: D1-hal and a compound represented by a formula: D2-OH are mixed in the presence of a base, such as sodium hydroxide and potassium hydroxide and condensed.

(iii) A compound represented by a formula: D1-J (J is an epoxy group) and a compound represented by a formula: D2-OH are mixed in the presence of a base, such as sodium hydroxide and potassium hydroxide and condensed.

(iv) A compound represented by a formula: D1-OFN (OFN is a group having an unsaturated bond) and a compound represented by a formula: D2-OMet are mixed in the presence of a base, such as sodium hydroxide and potassium hydroxide and subjected to an addition reaction.

(v) A compound represented by a formula: D1-hal and a compound represented by a formula: D2-OMet are mixed in the presence of copper or cuprous chloride and condensed (Ullmann condensation).

An ester linkage and an amide linkage may be formed as follows.

(vi) A compound represented by a formula: D1-COOH and a compound represented by a formula: D2-OH or D2-$NH_2$ are subjected to dehydration condensation in the presence of a dehydration condensation agent (N,N-dicyclohexylcarbodiimide, etc.).

(vii) A compound represented by a formula: D1-COOH is reacted with a halogenating agent to obtain a compound represented by a formula: D1-CO-hal, and the compound is reacted with a compound represented by a formula: D2-OH or D2-$NH_2$ in the presence of a base.

(viii) A compound represented by a formula: D1-COOH is reacted with an acid anhydride to obtain a mixed acid anhydride, and the mixed acid anhydride is reacted with a compound represented by a formula: D2-OH or D2-$NH_2$.

(ix) A compound represented by a formula: D1-COOH and a compound represented by a formula: D2-OH or D2-$NH_2$ are subjected to dehydration condensation in the presence of an acid catalyst or a base catalyst.

More specifically, the carbonyl compound (4) may be produced through a process shown in the following reaction formula.

an ether linkage (—O—), an ester linkage (—C(=O)—O— and —O—C(=O)—), or a carbonate linkage (—O—C(=O)—O—).

Specifically, a method for producing a compound (4') in which $Y^1$ is a group represented by a formula: $Y^{11}$—C(=O)—O— and a group represented by a formula: $Z^2$—$Y^8$-$G^2$-$Y^6$-$A^5$-$(Y^4$-$A^3)_m$-$Y^2$— is the same as a group represented by a formula: $Z^1$—$Y^7$-G-$Y^5$-$A^4$-$(Y^3$-$A^2)_n$-$Y^1$— is as follows.

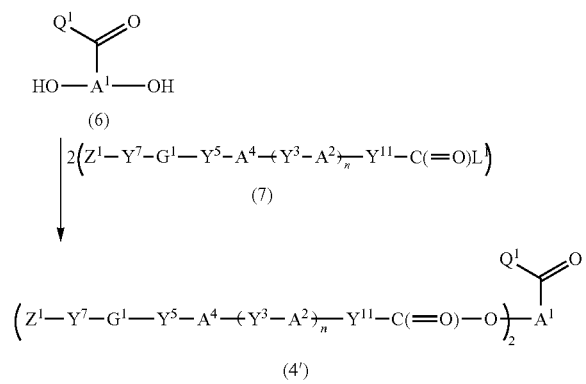

(In the formula, $Y^3$, $Y^5$, $Y^7$, $G^1$, $Z^1$, $A^1$, $A^2$, $A^4$, $Q^1$, n, and $L^1$ have the same meanings as described above; $Y^{11}$ is a group having a structure with which $Y^{11}$—C(=O)—O— corresponds to $Y^1$; and $Y^1$ has the same meanings as described above.)

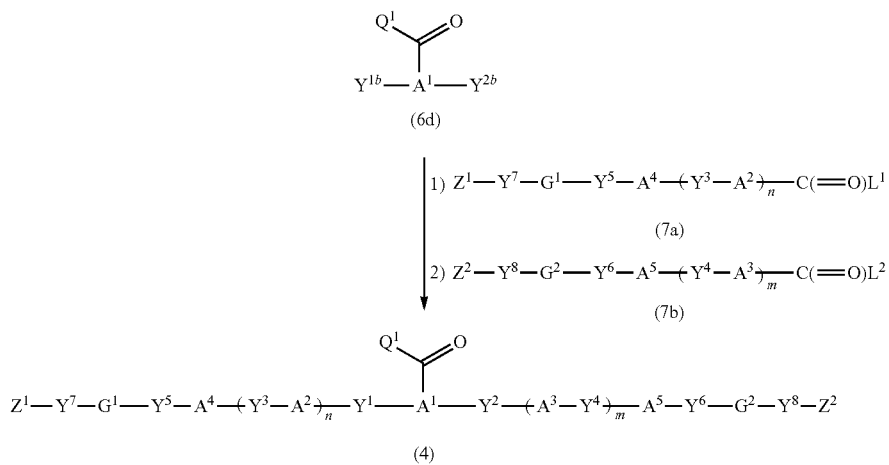

(In the formula, $Y^1$ to $Y^8$, $G^1$, $G^2$, $Z^I$, $Z^2$, $A^1$ to $A^5$, $Q^1$, m, and n have the same meanings as described above; $L^1$ and $L^2$ are each independently a leaving group, such as a hydroxyl group, a halogen atom, a methanesulfonyloxy group, and a p-toluenesulfonyloxy group; —$Y^{1b}$ is a group that is capable of being reacted with -$L^1$ to be —$Y^1$—; and —$Y^{2b}$ is a group that is capable of being reacted with -$L^2$ to be —$Y^2$—.)

As shown in the aforementioned reaction formula, the carbonyl compound (4) may be produced by reacting a compound represented by a formula (6d) with a compound represented by a formula (7a) followed by a compound represented by a formula (7b) by using a reaction of forming As shown in the aforementioned reaction formula, the compound (4') may be produced by a reaction of a dihydroxy compound represented by a formula (6) (compound (6)) with a compound represented by a formula (7) (compound (7)). In the aforementioned reaction, the molar ratio of "the compound (6):the compound (7)" is preferably 1:2 to 1:4, and more preferably 1:2 to 1:3. When the compounds are reacted at such a molar ratio, the compound (4') as a target can be highly selectively produced in high yield.

When the compound (7) is a compound in which $L^1$ is a hydroxyl group (carboxylic acid), the reaction may be performed in the presence of a dehydration condensation agent such as 1-ethyl-3-(3-dimethylaminopropyl)carbodiimide hydrochloride and dicyclohexyl carbodiimide, to obtain a target compound. The amount of the dehydration condensation agent used is usually 1 mol to 3 mol relative to 1 mol of the compound (7).

When the compound (7) is a compound in which $L^1$ is a hydroxyl group (carboxylic acid), the reaction may be performed in the presence of sulfonyl halide such as methanesulfonyl chloride and p-toluenesulfonyl chloride, and a base such as triethylamine, diisopropylethylamine, pyridine, and 4-(dimethylamino)pyridine, to obtain a target compound. The amount of the sulfonyl halide used is usually 1 mol to 3 mol relative to 1 mol of the compound (7). The amount of base used is usually 1 mol to 3 mol relative to 1 mol of the compound (7). In this case, a compound in which $L^1$ in the formula (7) is a sulfonyloxy group (mixed acid anhydride) may be isolated, before performing the subsequent reaction.

When the compound (7) is a compound in which $L^1$ is a halogen atom (acid halide), the reaction may be performed in the presence of a base to obtain a target compound. Examples of the base may include an organic base such as triethylamine and pyridine; and an inorganic base such as sodium hydroxide, sodium carbonate, and sodium hydrogen carbonate. The amount of base used is usually 1 mol to 3 mol relative to 1 mol of the compound (7).

Examples of a solvent for use in the reaction may include a chlorinated solvent, such as chloroform, and methylene chloride; an amide-based solvent, such as N-methylpyrrolidone, N,N-dimethylformamide, N,N-dimethylacetamide, and hexamethylphosphoric triamide; an ether-based solvent, such as 1,4-dioxane, cyclopentyl methyl ether, tetrahydrofuran, tetrahydropyran, and 1,3-dioxolane; a sulfur-containing solvent, such as dimethylsulfoxide, and sulfolane; an aromatic hydrocarbon-based solvent, such as benzene, toluene, and xylene; an aliphatic hydrocarbon-based solvent, such as n-pentane, n-hexane, and n-octane; an alicyclic hydrocarbon-based solvent, such as cyclopentane, and cyclohexane; and a mixed solvent of two or more types thereof.

The amount of the solvent used is not particularly limited, and may be determined in consideration of type of compound to be used, reaction scale, and the like. The specific amount of the solvent used is usually 1 g to 50 g relative to 1 g of the hydroxy compound (6).

Most of compounds (6) are known substances, and may be produced by known methods. For example, the compound (6) may be produced by a process shown in the following reaction formula (see International publication WO2009/042544 and The Journal of Organic Chemistry, 2011, 76, 8082-8087). A product commercially available as the compound (6) may be used with, if desired, purification.

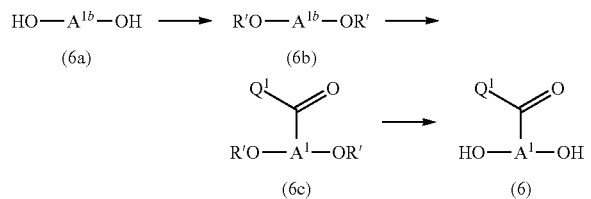

(wherein $A^1$ and $Q^1$ have the same meanings as described above; $A^{1b}$ is a divalent aromatic group that is capable of being formylated or acylated to form $A^1$; and $R^1$ is a protecting group of a hydroxyl group, such as an alkyl group of 1 to 6 carbon atoms such as a methyl group and an ethyl group and an alkoxyalkyl group of 2 to 6 carbon atoms such as a methoxymethyl group.)

As shown in the aforementioned reaction formula, a hydroxyl group of a dihydroxy compound represented by a formula (6a) (1,4-dihydroxybenzene, 1,4-dihydroxynaphthalene, etc.) is alkylated to obtain a compound represented by a formula (6b). Subsequently, an ortho position of an OR' group is formylated or acylated by a known method, to obtain a compound represented by a formula (6c). The obtained compound may be subjected to deprotection (dealkylation), to produce the compound (6) as a target.

The product commercially available as the compound (6) as it is may be used or with, if desired, purification.

Most of compounds (7) are known compounds, and may be produced, for example, by appropriately bonding and modifying a plurality of known compounds having a desired structure through any combination of reactions of forming an ether linkage (—O—), an ester linkage (—C(=O)—O— and —O—C(=O)—), a carbonate linkage (—O—C(=O)—O—), and an amide linkage (—C(=O)NH— and —NH—C(=O)—).

For example, when the compound (7) is a compound represented by the following formula (7') (compound (7')), the compound (7') may be produced as follows, using a dicarboxylic acid represented by a formula (9') (compound (9')).

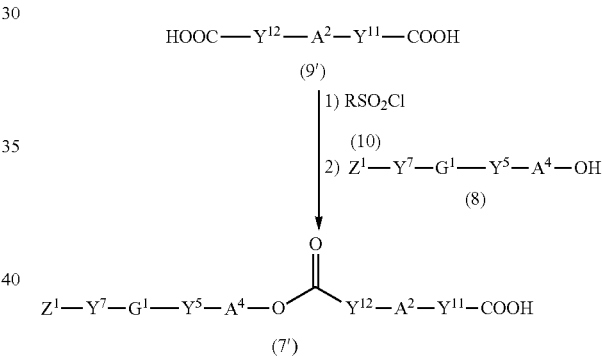

(In the formula, $Y^5$, $Y^7$, $G^1$, $Z^1$, $A^2$, $A^4$, and $Y^{11}$ have the same meanings as described above; $Y^{12}$ is a group having a structure with which —O—C(=O)—$Y^{12}$ corresponds to $Y^3$; and R is an alkyl group, such as a methyl group and an ethyl group, or an aryl group optionally having a substituent, such as a phenyl group and a p-methylphenyl group.)

The compound (9') is first reacted with sulfonyl chloride represented by a formula (10) in the presence of a base such as triethylamine or 4-(dimethylamino)pyridine. Subsequently, to the reaction mixture, a compound (8) and a base such as triethylamine or 4-(dimethylamino)pyridine are added to perform a reaction.

The amount of sulfonyl chloride used is usually 0.5 equivalents to 0.7 equivalents relative to 1 equivalent of the compound (9').

The amount of compound (8) used is usually 0.5 equivalents to 0.6 equivalents relative to 1 equivalent of the compound (9').

The amount of base used is usually 0.5 equivalents to 0.7 equivalents relative to 1 equivalent of the compound (9').

The reaction temperature is 20° C. to 30° C., and the reaction time may vary depending on the reaction scale, and the like, and is several minutes to several hours.

Examples of the solvent for use in the aforementioned reaction may include those exemplified as the examples of the solvent that may be used for producing the compound (4'). Among these, an ether solvent is preferable.

The amount of the solvent used is not particularly limited, and may be determined in consideration of type of compound to be used, reaction scale, and the like. For example, the specific amount of the solvent used is usually 1 g to 50 g relative to 1 g of the hydroxy compound (9').

In any of the reactions, a usual post-treatment operation in organic synthesis chemistry may be performed after completion of the reactions. If desired, a known separation and purification method such as column chromatography, recrystallization, and distillation may be performed to isolate a target compound.

The structure of the target compound may be identified by measurement such as NMR spectrometry, IR spectrometry, and mass spectrometry, and elemental analysis.

[3. Multifunctional (Meth)Acrylate Compound]

The multifunctional (meth)acrylate compound is a compound having two or more (meth)acryloyl groups in one molecule. The multifunctional (meth)acrylate compound may have an acryloyl group, may have a methacryloyl group, and may also have an acryloyl group and a methacryloyl group in combination. Since the liquid crystal composition of the present invention contains the aforementioned multifunctional (meth)acrylate compound in a specific ratio, there can be obtain an advantageous effect of achieving production of a liquid crystal cured layer having a high hardness and suppressed orientation defect. The specific amount of the multifunctional (meth)acrylate compound is usually 8 parts by weight or less, preferably 7 parts by weight or less, and particularly preferably 6 parts by weight or less, relative to 100 parts by weight of the sum total of the inverse wavelength polymerizable liquid crystal compound and the multifunctional (meth)acrylate compound.

The lower limit amount of the multifunctional (meth)acrylate compound is preferably 0.5 parts by weight or more, more preferably 1 part by weight or more, and particularly preferably 2 parts by weight or more, relative to 100 parts by weight of the sum total of the inverse wavelength polymerizable liquid crystal compound and the multifunctional (meth)acrylate compound. The larger the amount of the multifunctional (meth)acrylate compound is, the higher hardness the liquid crystal cured layer formed from the liquid crystal composition tends to have. When the amount of the multifunctional (meth)acrylate compound is confined within the aforementioned range, hardness of the liquid crystal cured layer can be sufficiently elevated at a high level, and thereby scratch resistance thereof suitable for use as an optical film can be achieved.

As the multifunctional (meth)acrylate compound to be contained in the liquid crystal composition of the present invention, one type thereof may be solely used, and two or more types thereof may also be used in combination at any ratio. When two or more types of the multifunctional (meth)acrylate compounds are used, it is preferable that the total amount of these multifunctional (meth)acrylate compounds falls within the abovementioned range.

The number of the (meth)acryloyl groups per one molecule of the multifunctional (meth)acrylate compound is usually 2 or more, preferably 3 or more, and more preferably 4 or more. When the multifunctional (meth)acrylate compound has a plurality of the (meth)acryloyl groups per one molecule, the multifunctional (meth)acrylate compound can react with a polymerizable compound such as the inverse wavelength polymerizable liquid crystal compound to form a cross-linking structure. This can effectively enhance the hardness of the liquid crystal cured layer. The upper limit of the number of the (meth)acryloyl groups per one molecule of the multifunctional (meth)acrylate compound is not particularly limited, but may preferably be 10 or less. When the number of the (meth)acryloyl groups per one molecule is equal to or less than the upper limit value of the aforementioned range, orientation defect can be efficiently suppressed while hardness of the liquid crystal cured layer can be elevated at a high level.

The acrylic equivalent of the multifunctional (meth)acrylate compound is preferably 140 or lower. The "acrylic equivalent" herein represents a molecular weight per one (meth)acryloyl group, and may be calculated by dividing the molecular weight of the multifunctional (meth)acrylate compound by the number of the (meth)acryloyl groups per one molecule of the multifunctional (meth)acrylate compound. When the acrylic equivalent of the multifunctional (meth)acrylate compound falls within the aforementioned range, hardness of the liquid crystal cured layer can be effectively elevated at a high level and orientation defect can also be effectively suppressed. The lower limit of the acrylic equivalent of the multifunctional (meth)acrylate compound is not particularly limited, but may preferably be 80 or more. When the acrylic equivalent is equal to or more than the lower limit as described above, hardness of the liquid crystal cured layer can be effectively elevated at a high level and orientation defect can also be effectively suppressed.

The multifunctional (meth)acrylate compound preferably contains an isocyanate group in combination with the (meth)acryloyl group. When the multifunctional (meth)acrylate compound contains an isocyanate group, the reaction proceeds by heat or humidity after cured, to form a cross-linking structure. This can effectively enhance hardness of the cures liquid crystal layer. The number of the isocyanate group per one molecule of the multifunctional (meth)acrylate compound is preferably 2 or more. The upper limit thereof is not particularly limited, but may preferably be 8 or less.

The multifunctional (meth)acrylate compound may or may not contain an aromatic ring. When a multifunctional (meth)acrylate compound containing no aromatic ring is used, the effect on anisotropy of the liquid crystal cured layer can be suppressed. When a multifunctional (meth)acrylate compound containing an aromatic ring is used, increase in film hardness can be expected when compared with the case where the multifunctional (meth)acrylate compound is aliphatic. In this case, the number of the aromatic rings per one molecule of the multifunctional (meth)acrylate compound is preferably 1 to 8.

The molecular weight of the multifunctional (meth)acrylate compound is preferably 250 or more, more preferably 300 or more, and particularly preferably 350 or more, and is preferably 1,150 or less, more preferably 1,100 or less, and particularly preferably 1,050 or less. When the multifunctional (meth)acrylate compound for use has a molecular weight within such a range, hardness of the liquid crystal cured layer can be effectively elevated at a high level and orientation defect can also be effectively suppressed.

The multifunctional (meth)acrylate compound may be a liquid crystal compound having liquid crystal properties or a non-liquid crystal compound having no liquid crystal property. From the viewpoint of variety of many commercial products and high availability, the multifunctional (meth)acrylate compound is preferably a non-liquid crystal compound having no liquid crystal property.

Examples of the preferred multifunctional (meth)acrylate compounds may include the following compounds.
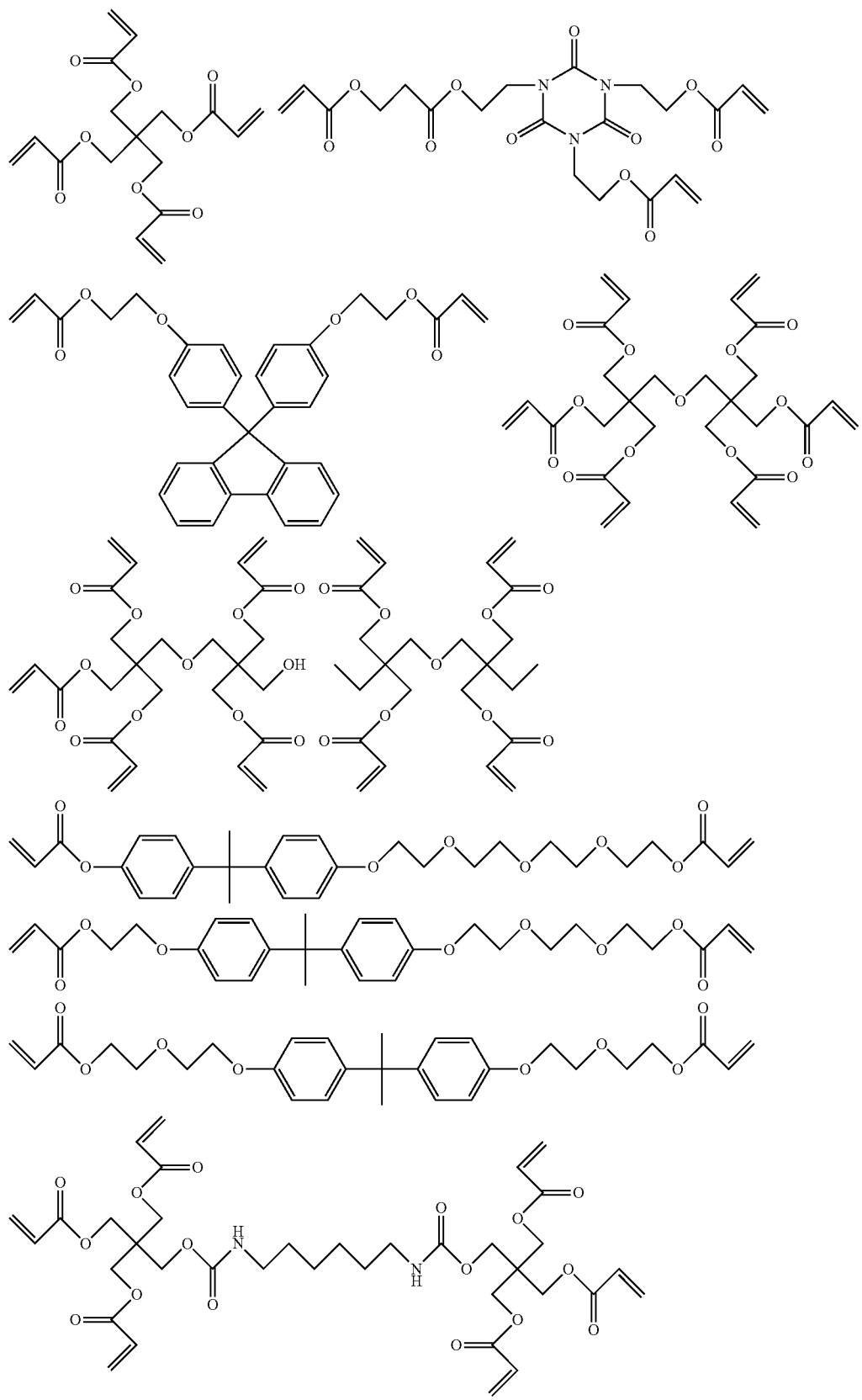

-continued
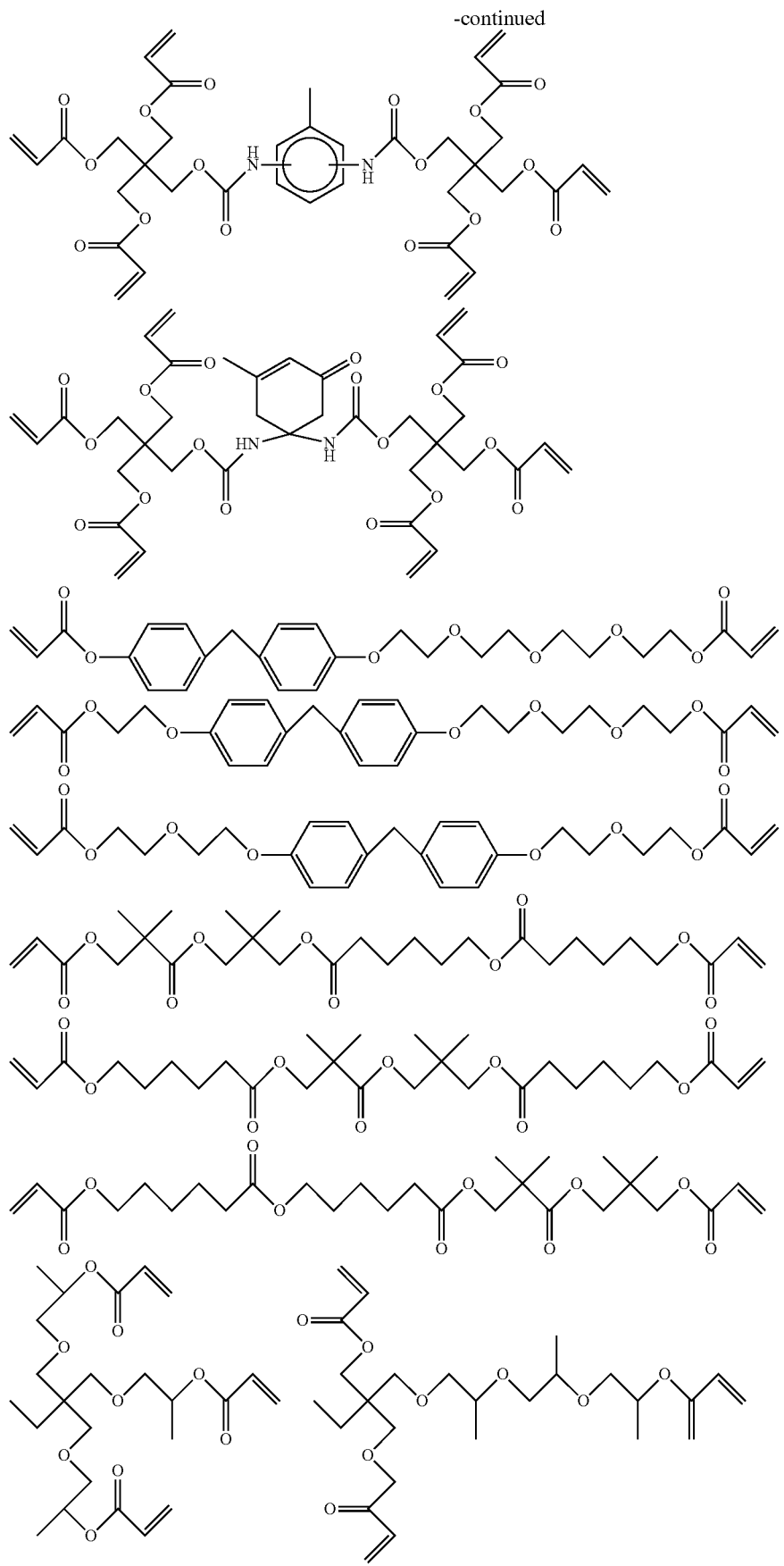

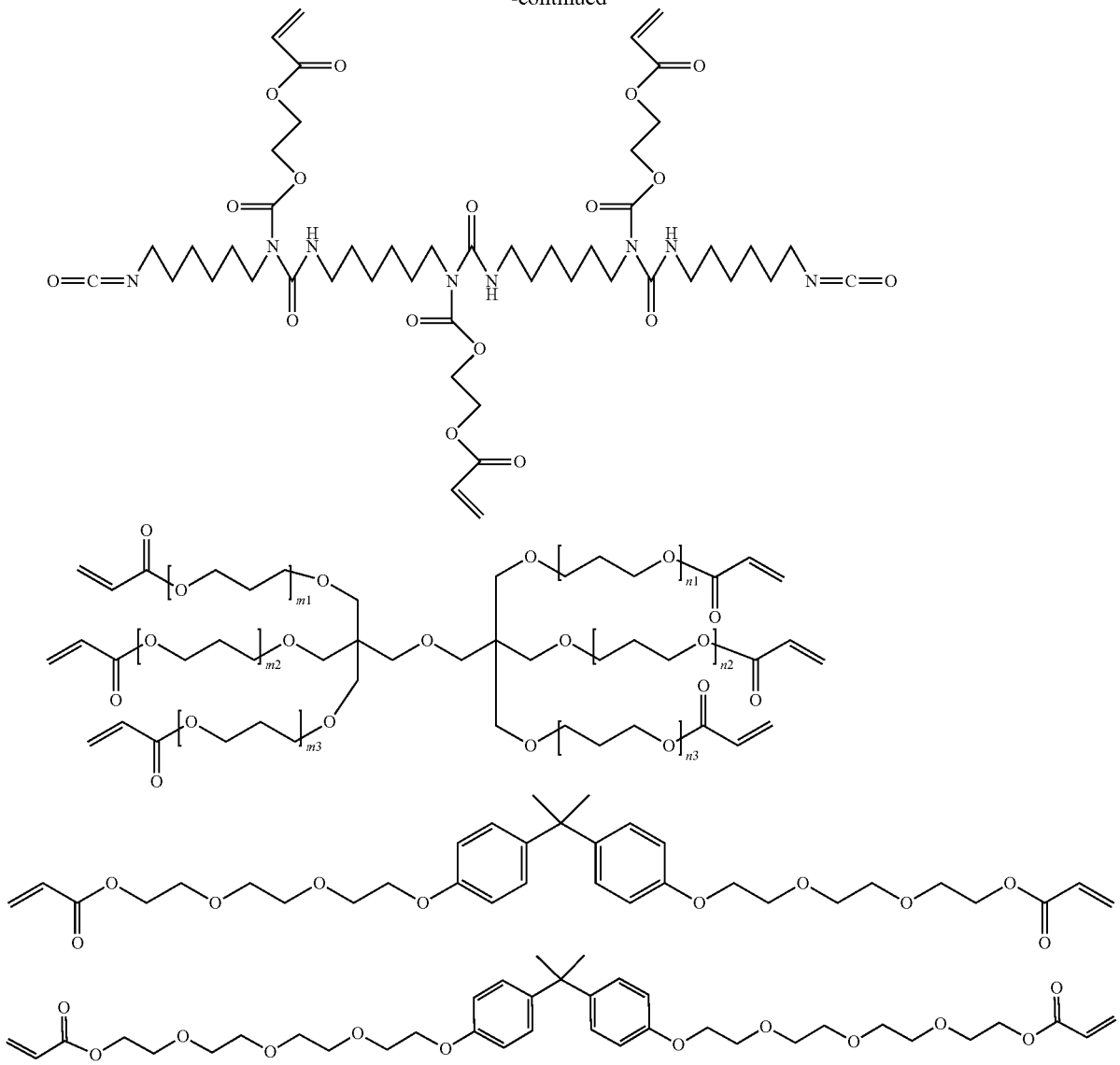

[4. Optional Component]

The liquid crystal composition of the present invention may contain an optional component in combination with the inverse wavelength polymerizable liquid crystal compound and the multifunctional (meth)acrylate compound. As the optional component, one type thereof may be solely used, and two or more types thereof may also be used in combination at any ratio.

For example, the liquid crystal composition may contain a solvent. As the solvent, a solvent capable of dissolving the inverse wavelength polymerizable liquid crystal compound is preferable. As such a solvent, an organic solvent is usually used. Examples of the organic solvent may include a ketone solvent, such as cyclopentanone, cyclohexanone, methyl ethyl ketone, acetone, and methyl isobutyl ketone; an acetic acid ester solvent, such as butyl acetate, and amyl acetate; a halogenated hydrocarbon solvent, such as chloroform, dichloromethane, and dichloroethane; an ether solvent, such as 1,4-dioxane, cyclopentyl methyl ether, tetrahydrofuran, tetrahydropyran, 1,3-dioxolane, and 1,2-dimethoxyethane; and an aromatic hydrocarbon-based solvent, such as toluene, xylene, and mesitylene.

The boiling point of the solvent is preferably 60° C. to 250° C., and more preferably 60° C. to 150° C. from the viewpoint of excellent handleability.

The amount of the solvent is preferably 200 parts by weight or more, more preferably 250 parts by weight or more, and particularly preferably 300 parts by weight or more, and is preferably 650 parts by weight or less, more preferably 550 part by weight or less, and particularly preferably 450 parts by weight or less, relative to 100 parts by weight of the total amount of the inverse wavelength polymerizable liquid crystal compound and the multifunctional (meth)acrylate compound. When the amount of the solvent is equal to or more than the lower limit value of the aforementioned range, generation of undesirable substance can be suppressed. When it is equal to or less than the upper limit value of the aforementioned range, drying load can be decreased.

For example, the liquid crystal composition may contain a polymerization initiator. The type of the polymerization initiator may be selected depending on the type of the inverse wavelength polymerizable liquid crystal compound.

For example, when the inverse wavelength polymerizable liquid crystal compound is radically polymerizable, a radical polymerization initiator may be used. Further, when the inverse wavelength polymerizable liquid crystal compound is anionically polymerizable, an anionic polymerization initiator may be used. When the inverse wavelength polymerizable liquid crystal compound is cationically polymerizable, a cationic polymerization initiator may be used.

As the radical polymerization initiator, any of a thermal radical generator that is a compound that generates active species capable of initiating polymerization of the inverse wavelength polymerizable liquid crystal compound by heating; and a photo-radical generator that is a compound that generates active species capable of initiating polymerization of the inverse wavelength polymerizable liquid crystal compound by exposure to exposure light, such as visible light rays, ultraviolet rays (i-line, etc.), far-ultraviolet rays, an electron beam, and a X-ray may be used. Among these, as the radical polymerization initiator, a photo-radical generator is suitable.

Examples of the photo-radical generator may include an acetophenone-based compound, a biimidazole-based compound, a triazine-based compound, an O-acyl oxime-based compound, an onium salt-based compound, a benzoin-based compound, a benzophenone-based compound, an α-diketone-based compound, a polynuclear quinone-based compound, a xanthone-based compound, a diazo-based compound, and an imide sulfonate-based compound. These compounds is capable of generating one or both of active radical and active acid by light exposure.

Specific examples of the acetophenone-based compound may include 2-hydroxy-2-methyl-1-phenylpropan-1-one, 2-methyl-1-[4-(methylthio)phenyl]-2-morpholinopropan-1-one, 2-benzyl-2-dimethylamino-1-(4-morpholinophenyl)-butan-1-one, 1-hydroxycyclohexyl phenyl ketone, 2,2-dimethoxy-1,2-diphenylethan-1-one, 1,2-octanedione, and 2-benzyl-2-dimethylamino-4'-morpholinobutyrophenone.

Specific examples of the biimidazole-based compound may include 2,2'-bis(2-chlorophenyl)-4,4',5,5'-tetrakis(4-ethoxycarbonylphenyl)-1,2'-biimidazole, 2,2'-bis(2-bromophenyl)-4,4',5,5'-tetrakis(4-ethoxycarbonylphenyl)-1,2'-biimidazole, 2,2'-bis(2-chlorophenyl)-4,4',5,5'-tetraphenyl-1,2'-biimidazole, 2,2'-bis(2,4-dichlorophenyl)-4,4',5,5'-tetraphenyl-1,2'-biimidazole, 2,2'-bis(2,4,6-trichlorophenyl)-4,4',5,5'-tetraphenyl-1,2'-biimidazole, 2,2'-bis(2-bromophenyl)-4,4',5,5'-tetraphenyl-1,2'-biimidazole, 2,2'-bis(2,4-dibromophenyl)-4,4',5,5'-tetraphenyl-1,2'-biimidazole, and 2,2'-bis(2,4,6-tribromophenyl)-4,4',5,5'-tetraphenyl-1,2'-biimidazole.

When the biimidazole-based compound is used as the polymerization initiator, the sensitivity can be further improved by use of a hydrogen donor in combination with the biimidazole-based compound. Herein, the "hydrogen donor" means a compound capable of donating a hydrogen atom to a radical generated from the biimidazole-based compound by light exposure. The hydrogen donor is preferably a mercaptane-based compound or an amine-based compound, which are shown below.

Examples of the mercaptane-based compound may include 2-mercaptobenzothiazole, 2-mercaptobenzoxazole, 2-mercaptobenzimidazole, 2,5-dimercapto-1,3,4-thiadiazole, and 2-mercapto-2,5-dimethylaminopyridine. Examples of the amine-based compound may include 4,4'-bis(dimethylamino)benzophenone, 4,4'-bis(diethylamino)benzophenone, 4-diethylaminoacetophenone, 4-dimethylaminopropiophenone, ethyl-4-dimethylaminobenzoate, 4-dimethylaminobenzoic acid, and 4-dimethylaminobenzonitrile.

Examples of the triazine-based compound may include a triazine-based compound having a halomethyl group, such as 2,4,6-tris(trichloromethyl)-s-triazine, 2-methyl-4,6-bis(trichloromethyl)-s-triazine, 2-[2-(5-methylfuran-2-yl)ethenyl]-4,6-bis(trichloromethyl)-s-triazine, 2-[2-(furan-2-yl)ethenyl]-4,6-bis(trichloromethyl)-s-triazine, 2-[2-(4-diethylamino-2-methylphenyl)ethenyl]-4,6-bis(trichloromethyl)-s-triazine, 2-[2-(3,4-dimethoxyphenyl)ethenyl]-4,6-bis(trichloromethyl)-s-triazine, 2-(4-methoxyphenyl)-4,6-bis(trichloromethyl)-s-triazine, 2-(4-ethoxystyryl)-4,6-bis(trichloromethyl)-s-triazine, and 2-(4-n-butoxyphenyl)-4,6-bis(trichloromethyl)-s-triazine.

Specific examples of the O-acyl oxime-based compound may include 1-[4-(phenylthio)phenyl]-heptane-1,2-dione 2-(O-benzoyloxime), 1-[4-(phenylthio)phenyl]-octane-1,2-dione 2-(O-benzoyloxime), 1-[4-(benzoyl)phenyl]-octane-1,2-dione 2-(O-benzoyloxime), 1-[9-ethyl-6-(2-methylbenzoyl)-9H-carbazol-3-yl]-ethanone 1-(O-acetyloxime), 1-[9-ethyl-6-(3-methylbenzoyl)-9H-carbazol-3-yl]-ethanone 1-(O-acetyloxime), 1-(9-ethyl-6-benzoyl-9H-carbazol-3-yl)-ethanone 1-(O-acetyloxime), ethanone-1-[9-ethyl-6-(2-methyl-4-tetrahydrofuranylbenzoyl)-9.H.-carbazol-3-yl]-1-(O-acetyloxime), ethanone-1-[9-ethyl-6-(2-methyl-4-tetrahydropyranylbenzoyl)-9.H.-carbazol-3-yl]-1-(O-acetyloxime), ethanone-1-[9-ethyl-6-(2-methyl-5-tetrahydrofuranylbenzoyl)-9.H.-carbazol-3-yl]-1-(0-acetyloxime), ethanone-1-[9-ethyl-6-(2-methyl-5-tetrahydropyranylbenzoyl)-9.H.-carbazol-3-yl]-1-(O-acetyloxime), ethanone-1-[9-ethyl-6-{2-methyl-4-(2,2-dimethyl-1,3-dioxolanyl)benzoyl}-9.H.-carbazol-3-yl]-1-(O-acetyloxime), ethanone-1-[9-ethyl-6-(2-methyl-4-tetrahydrofuranylmethoxybenzoyl)-9.H.-carbazol-3-yl]-1-(0-acetyloxime), ethanone-1-[9-ethyl-6-(2-methyl-4-tetrahydropyranylmethoxybenzoyl)-9.H.-carbazol-3-yl]-1-(O-acetyloxime), ethanone-1-[9-ethyl-6-(2-methyl-5-tetrahydrofuranylmethoxybenzoyl)-9.H.-carbazol-3-yl]-1-(O-acetyloxime), ethanone,1-[9-ethyl-6-(2-methylbenzoyl)-9H-carbazol-3-yl]-1-(O-acetyloxime), ethanone-1-[9-ethyl-6-(2-methyl-5-tetrahydropyranylmethoxybenzoyl)-9.H.-carbazol-3-yl]-1-(O-acetyloxime), and ethanone-1-[9-ethyl-6-{2-methyl-4-(2,2-dimethyl-1,3-dioxolanyl)methoxybenzoyl}-9.H.-carbazol-3-yl]-1-(0-acetyloxime).

As the photo-radical generator, a commercially available product as it is may be used. Specific examples thereof may include trade name: Irgacure907, Irgacure184, Irgacure369, Irgacure651, Irgacure819, Irgacure907, Irgacure379, and Irgacure OXE02, available from BASF, and trade name: ADEKA OPTOMER N1919 available from ADEKA CORPORATION.

Examples of the anionic polymerization initiator may include an alkyl lithium compound; a monolithium salt or a monosodium salt of biphenyl, naphthalene, and pyrene; and a polyfunctional initiator such as a dilithium salt, and a trilithium salt.

Examples of the cationic polymerization initiator may include a protonic acid, such as sulfuric acid, phosphoric acid, perchloric acid, and trifluoromethanesulfonic acid; Lewis acids, such as boron trifluoride, aluminum chloride, titanium tetrachloride, and tin tetrachloride; and an aromatic onium salt, and a combination of an aromatic onium salt with a reducing agent.

As the polymerization initiator, one type thereof may be solely used, and two or more types thereof may also be used in combination at any ratio.

The amount of the polymerization initiator is preferably 0.1 parts by weight or more, and more preferably 0.5 parts by weight or more, and is preferably 30 parts by weight or less, and more preferably 10 parts by weight or less, relative to 100 parts by weight of the inverse wavelength polymerizable liquid crystal compound. When the amount of the polymerization initiator falls within the aforementioned range, polymerization of the inverse wavelength polymerizable liquid crystal compound can efficiently proceed.

Examples of the optional component may include a polymerizable compound other than the inverse wavelength polymerizable liquid crystal compound and the multifunctional (meth)acrylate compound; a metal; a metal complex; a metal oxide such as titanium oxide; a colorant such as a dye and a pigment; a light-emitting material such as a fluorescent material and a phosphorescent material; a leveling agent; a thixotropic agent; a gelator; a polysaccharide; a surfactant; an ultraviolet ray absorber; an infrared absorber; an antioxidant; and an ion exchange resina. Specifically, the amount of each of these components may be 0.1 parts by weight to 20 parts by weight relative to 100 parts by weight of the total amount of the inverse wavelength polymerizable liquid crystal compound and the multifunctional (meth)acrylate compound.

[5. State of Liquid Crystal Composition]

The liquid crystal composition of the present invention may be in a fluid state, and may also be in a solid state. The state of the liquid crystal composition may be adjusted in accordance with the manner of use of the liquid crystal composition. For example, when the liquid crystal composition is applied onto a substrate to form a layer of the liquid crystal composition, the liquid crystal composition is preferably in a fluid state. Furthermore, when the inverse wavelength polymerizable liquid crystal compound contained in the layer of the liquid crystal composition is oriented, for example, the liquid crystal composition is preferably in a fluid state.

[6. Method for Producing Liquid Crystal Cured Layer Using Liquid Crystal Composition]

When the liquid crystal composition of the present invention is used, the resulting liquid crystal cured layer can have a high hardness and suppressed orientation defect. The liquid crystal cured layer is a layer formed of the cured product of the liquid crystal composition of the present invention, and may be produced by the production method including the following steps (i) to (iii):

(i) a step of forming a layer of the liquid crystal composition of the present invention on a supporting surface;

(ii) a step of causing orientation the polymerizable liquid crystal compound contained in the layer of the aforementioned liquid crystal composition; and (iii) a step of curing the layer of the liquid crystal composition.

As the supporting surface, any surface that is capable of supporting the layer of the liquid crystal composition may be used. From the viewpoint of achieving favorable surface state of the liquid crystal cured layer, a flat surface without no recess and no protrusion is usually used as the supporting surface. From the viewpoint of the productivity of the liquid crystal cured layer, a surface of a long-length substrate is preferably used as the supporting surface. The "long-length" herein refers to a shape having a length that is 5 or more times longer than the width, and preferably 10 or more times longer than the width, and specifically refers to a film shape long enough to be wound up into a rolled form and stored or transported.

As the substrate, a resin film is usually used. As the resin, a thermoplastic resin is usually used. In particular, from the viewpoint of high orientation-regulating force, high mechanical strength, and low cost, a resin having a positive intrinsic birefringence value is preferably used as the resin. Further, it is preferable that a resin containing an alicyclic structure-containing polymer, such as a norbornene-based resin, is used since it has excellent transparency, low hygroscopicity, size stability, and light-weight properties. Suitable examples of the product names of the resin to be contained in the substrate may include "ZEONOR 1420" and "ZEONOR 1420R" manufactured by ZEON Corporation.

In order to promote orientation of the inverse wavelength polymerizable liquid crystal compound in the layer of the liquid crystal composition, it is preferable that the surface of the substrate serving as the supporting surface has been subjected to a treatment of imparting an orientation-regulating force. The "orientation-regulating force" means properties of a supporting surface that is capable of causing orientation of an inverse wavelength polymerizable liquid crystal compound in a liquid crystal composition. Examples of the treatment of imparting the orientation-regulating force to the supporting surface may include a light orientation treatment, a rubbing treatment, an orientation film formation treatment, an ion beam orientation treatment, and a stretching treatment. Among these, a stretching treatment is preferable.

When the substrate is subjected to a stretching treatment under appropriate conditions, the molecules of the polymer contained in the substrate can be oriented. By this treatment, the orientation-regulating force for causing orientation of the inverse wavelength polymerizable liquid crystal compound in a direction of orientation of molecules of the polymer contained in the substrate can be imparted to the surface of the substrate. By the stretching treatment, in particular, molecular directors are oriented approximately uniformly over the entire thickness direction of the substrate. Therefore, by the stretching treatment, relaxation of orientation-regulating force over the lapse of time due to effects by environment (heat, light, oxygen, etc.) is unlikely to occur as compared with other treatments such as the rubbing treatment in which the orientation-regulating force is imparted to the substrate by the molecular orientation of only the vicinity of the surface of the substrate. The stretching treatment can further suppress dust emission, cracking, and contamination.

It is preferable that the substrate is stretched in a manner such that anisotropy is imparted to the substrate whereby a slow axis is expressed in the substrate. By such a stretching, the orientation-regulating force for causing orientation of the inverse wavelength polymerizable liquid crystal compound in a direction parallel or perpendicular to the slow axis of the substrate is imparted to the surface of the substrate. For example, when a resin having a positive intrinsic birefringence value is used as a material for the substrate, the molecules of the polymer contained in the substrate are usually oriented in a stretching direction to express a slow axis parallel to the stretching direction. Therefore, the orientation-regulating force of causing orientation of the inverse wavelength polymerizable liquid crystal compound in the direction parallel to the slow axis of the substrate is imparted to the surface of the substrate. Accordingly, the stretching direction of the substrate may be set according to a desired orientation direction in which the inverse wavelength polymerizable liquid crystal compound is intended to be oriented. The stretching may be performed only in one direction, and may also be performed in two or more directions. Such a stretching may be performed by a stretching machine such as a tenter stretching machine.

The stretching ratio may be set so that the birefringence Δn of the substrate after stretching falls within a desired range. The birefringence Δn of the substrate after stretching is preferably 0.000050 or more, and more preferably 0.000070 or more, and is preferably 0.007500 or less, and more preferably 0.007000 or less. When the birefringence Δn of the substrate after stretching is equal to or more than the lower limit value of the aforementioned range, a favorable orientation-regulating force can be imparted to the surface of the substrate. When the birefringence Δn is equal to or less than the upper limit value of the aforementioned range, retardation of the substrate can be decreased. Therefore, the liquid crystal cured layer and the substrate may be used in combination without peeling the substrate from the liquid crystal cured layer for various types of use applications.

The aforementioned stretching may be performed by a stretching machine such as a tenter stretching machine.

After the substrate is prepared as necessary, the step of forming a layer of the liquid crystal composition on the supporting surface, such as the surface of the substrate. The layer of the liquid crystal composition is formed usually by applying the liquid crystal composition onto a supporting surface. Examples of the method for applying the liquid crystal composition may include a curtain coating method, an extrusion coating method, a roll coating method, a spin coating method, a dip coating method, a bar coating method, a spray coating method, a slide coating method, a printing coating method, a gravure coating method, a die coating method, a gap coating method, and a dipping method.

After the layer of the liquid crystal composition is formed, the step of causing orientation the inverse wavelength polymerizable liquid crystal compound contained in the layer of the liquid crystal composition is performed. In this step, the layer of the liquid crystal composition is usually subjected to an orientation treatment to orient the inverse wavelength polymerizable liquid crystal compound in a direction according to the orientation-regulating force of the supporting surface.

The orientation treatment is usually performed by adjusting the temperature of the layer of the liquid crystal composition to a specific orientation temperature. The orientation temperature may be a temperature equal to or higher than a temperature at which the liquid crystal composition exhibits its liquid crystal properties. In this case, the orientation temperature is preferably a temperature lower than the glass transition temperature of the resin contained in the substrate. This can prevent generation of a strain of the substrate due to the orientation treatment. Specific examples of the conditions for the orientation treatment may include conditions of treatment for 30 seconds to 5 minutes at a temperature condition of 50° C. to 160° C.

However, in some cases, the orientation of the inverse wavelength polymerizable liquid crystal compound may be achieved immediately by the application of the liquid crystal composition of the present invention. Therefore, the layer of the liquid crystal composition may not necessarily be subjected to the orientation treatment for causing orientation of the inverse wavelength polymerizable liquid crystal compound.

After the inverse wavelength polymerizable liquid crystal compound is oriented, the step of curing the aforementioned layer of the liquid crystal composition to obtain the liquid crystal cured layer. In this step, the layer of the liquid crystal composition is cured usually by polymerizing the inverse wavelength polymerizable liquid crystal compound. In the step of curing the layer of the liquid crystal composition, a cross-linking reaction of the multifunctional (meth)acrylate compound may also proceed in addition to the polymerization reaction of the inverse wavelength polymerizable liquid crystal compound.

As the method for polymerizing the inverse wavelength polymerizable liquid crystal compound, a method suitable for the properties of components contained in the liquid crystal composition may be selected. Examples of the polymerization method may include an active energy ray irradiation method and a thermal polymerization method. Among these, the active energy ray irradiation method is preferable since a polymerization reaction can proceed at room temperature and heating is therefore unnecessary. Here, the active energy ray for irradiation may include visible light, ultraviolet light, and infrared light, and any energy ray such as an electron beam.

In particular, an irradiation method using light such as ultraviolet light is preferable since the operation thereof is simple. The temperature during irradiation with ultraviolet light is preferably equal to or lower than the glass transition temperature of the substrate. The temperature is preferably 150° C. or lower, more preferably 100° C. or lower, and particularly preferably 80° C. or lower. The lower limit of the temperature during irradiation with ultraviolet light may be 15° C. or higher. The irradiation intensity of ultraviolet light is preferably 0.1 mW/cm$^2$ or more, and more preferably 0.5 mW/cm$^2$ or more, and is preferably 1,000 mW/cm$^2$ or less, and more preferably 600 mW/cm$^2$ or less.

The method for producing the liquid crystal cured layer may further include an optional step, in addition to the aforementioned steps.

For example, the method for producing the liquid crystal cured layer may include a step of drying the layer of the liquid crystal composition before the step of polymerizing the inverse wavelength polymerizable liquid crystal compound. Such drying may be achieved by a drying method such as natural drying, heat drying, drying under reduced pressure, or heat drying under reduced pressure. By the drying, the solvent can be removed from the layer of the liquid crystal composition.

Furthermore, for example, the method for producing the liquid crystal cured layer may include a step of peeling the produced liquid crystal cured layer from the supporting surface.

[7. Liquid Crystal Cured Layer]

By the aforementioned production method, the liquid crystal cured layer formed of the cured product of the liquid crystal composition of the present invention is obtained. Usually, the liquid crystal phase of the inverse wavelength polymerizable liquid crystal compound is lost by the polymerization, and the liquid crystal cured layer is obtained as a layer containing a polymer obtained by polymerization of the inverse wavelength polymerizable liquid crystal compound. The aforementioned polymer usually has a cross-linking structure due to the multifunctional (meth)acrylate compound. The resulting liquid crystal cured layer thereby has a high hardness, and therefore has an excellent scratch resistance.

The hardness of the liquid crystal cured layer may be specifically evaluated on the basis of an increased haze value. The increased haze value is measured when the surface of the liquid crystal cured layer is rubbed with nonwoven fabric having a diameter of 12 mm and made of lyocell under the conditions of an application load of 200 g, a moving speed of the nonwoven fabric of 2,000 mm/min, a moving distance of the nonwoven fabric of 30 mm, and a rubbing number with the nonwoven fabric of thirty reciprocations. The increased haze value of the liquid crystal cured layer formed of the cured product of the liquid crystal composition of the present invention is preferably 0.60% or less, and more preferably 0.30% or less. The lower limit of the increased haze value is not particularly limited, but usually 0.00% or more.

In the liquid crystal cured layer formed of the cured product of the liquid crystal composition of the present invention, the orientation defect is suppressed. In a general method for producing such a liquid crystal cured layer, the temperature of the liquid crystal composition containing the inverse wavelength polymerizable liquid crystal compound is elevated for orientation. The temperature then falls by the time of completion of curing. The orientation is likely to be disturbed during such a temperature fall. In particular, the disturbance of the orientation is noticeable in the liquid crystal composition containing a cross-linking agent. In contrast, the liquid crystal composition of the present invention can suppress the disturbance of the orientation and the orientation at a high degree that is established immediately after the orientation treatment can be maintained until being cured. As a result, the orientation defect can be suppressed. The liquid crystal cured layer of the present invention has excellent uniformity of optical properties in a plane, and therefore can achieve the optical film having high qualities. Since the orientation defect can be suppressed in the liquid crystal cured layer in the above-described manner, the aforementioned liquid crystal cured layer can be produced with a higher yield.

The orientation defect in the liquid crystal cured layer may be evaluated by the following method.

A sample film including the liquid crystal cured layer is prepared, and placed in a polarizing optical microscope. The polarizer and analyzer of the polarizing optical microscope are set in a crossed Nicols arrangement to observe the sample film. The observation is performed while the position of the sample film is (i) at the extinction position, and (ii) at a position where the slow axis of the liquid crystal cured layer is shifted from the extinction position by several degrees. The orientation defect can be evaluated by such observation.

As described above, the polymer of the inverse wavelength polymerizable liquid crystal compound in the liquid crystal cured layer maintains the orientation state of the inverse wavelength polymerizable liquid crystal compound. Thus, the liquid crystal cured layer can have optical properties corresponding to the orientation state of the inverse wavelength polymerizable liquid crystal compound. For example, since the liquid crystal cured layer contains the polymer oriented in the aforementioned manner, the layer can have birefringence with inverse wavelength dispersion. Thus, the liquid crystal cured layer may be an optical anisotropic layer having a retardation with inverse wavelength dispersion. Herein, the retardation with inverse wavelength dispersion means a retardation in which a retardation Re(450) at a wavelength of 450 nm, a retardation Re(550) at a wavelength of 550 nm, and a retardation Re(650) at a wavelength of 650 nm usually satisfy the following equation (D3), and preferably satisfy the following equation (D4). When the liquid crystal cured layer has a retardation with inverse wavelength dispersion, the liquid crystal cured layer can uniformly express a function over a wide wavelength band for optical applications such as a ¼ wavelength plate or a ½ wavelength plate.

$$Re(450)<Re(650) \quad (D3)$$

$$Re(450)<Re(550)<Re(650) \quad (D4)$$

The specific range of the retardation of the liquid crystal cured layer may be optionally set according to the use application of the liquid crystal cured layer. For example, when the liquid crystal cured layer is desired to function as a ¼ wavelength plate, the retardation Re(550) of the liquid crystal cured layer is preferably 80 nm or more, more preferably 100 nm or more, and particularly preferably 120 nm or more, and is preferably 180 nm or less, more preferably 160 nm or less, and particularly preferably 150 nm or less. For example, when the liquid crystal cured layer is desired to function as a ½ wavelength plate, the retardation Re(550) of the liquid crystal cured layer is preferably 245 nm or more, more preferably 265 nm or more, and particularly preferably 270 nm or more, and is preferably 305 nm or less, more preferably 285 nm or less, and particularly preferably 280 nm or less.

The thickness of the liquid crystal cured layer may be appropriately set such that properties such as retardation can be within desired ranges. Specifically, the thickness of the liquid crystal cured layer is preferably 0.5 μm or more, and more preferably 1.0 μm or more, and is preferably 10 μm or less, and more preferably 7 μm or less.

[8. Optical Film]

The aforementioned liquid crystal cured layer may be used alone or in combination with any optional film layer, as an optical film.

For example, the liquid crystal cured layer may be used alone as a phase difference film, such as a ½ wavelength plate, a ¼ wavelength plate, and the like. When the substrate used for production of the liquid crystal cured layer has sufficiently high transparency, a multilayer film including the substrate and the liquid crystal cured layer may be used as the aforementioned phase difference film.

Furthermore, for example, the liquid crystal cured layer may be used as a circularly polarizing plate in combination with a linear polarizer. As a specific example, a multilayer film including the liquid crystal cured layer having a retardation functioning as a ¼ wavelength plate and a linear polarizer may be used as the circularly polarizing plate. In this case, an angle formed between a slow axis of the liquid crystal cured layer and a transmission axis of the linear polarizer when viewed in a thickness direction is preferably 45° or an angle near 450, and specifically preferably 40° to 50°.

EXAMPLES

Hereinafter, the present invention will be specifically described with reference to Examples. However, the present invention is not limited to Examples described below. The present invention may be freely modified and practiced without departing from the scope of claims of the present invention and the scope of their equivalents.

Unless otherwise specified, "%" and "part(s)" that represent an amount in the following description are on the basis of weight. Unless otherwise specified, operations described below were performed under conditions of normal temperature and normal pressure.

[Description of Multifunctional (Meth)Acrylate Compound]

A description will now be given of the multifunctional (meth)acrylate compound used in Examples and Comparative Examples.

(1) The multifunctional (meth)acrylate compound "A-TMMT" manufactured by Shin-Nakamura Chemical Co., Ltd. is pentaerythritol tetraacrylate, of which chemical formula is as follows.

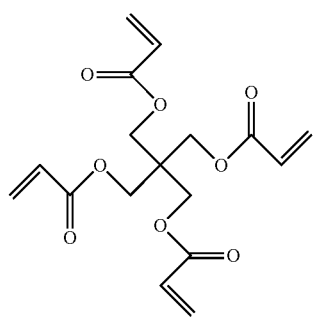 [SMILES: C=CC(=O)OCC(COC(=O)C=C)(COC(=O)C=C)COC(=O)C=C]

(2) The multifunctional (meth)acrylate compound "A-DPH-6P" manufactured by Shin-Nakamura Chemical Co., Ltd. has a chemical formula as follows.

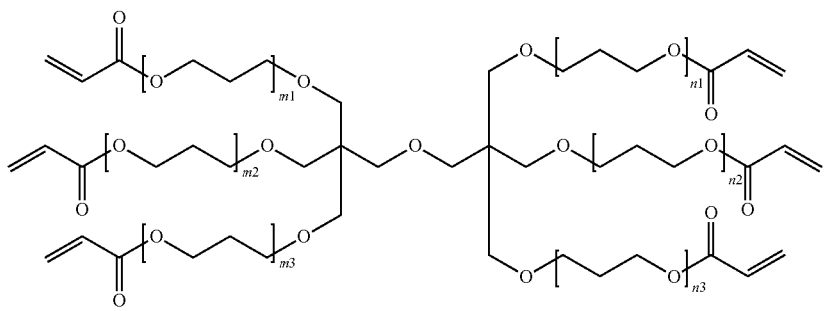

(3) The multifunctional (meth)acrylate compound "A-9300-1CL" manufactured by Shin-Nakamura Chemical Co., Ltd. is ε-caprolactone modified tris-(2-acryloyloxyethyl)isocyanurate, of which chemical formula is as follows.

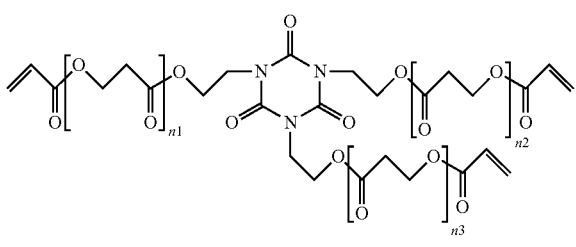

n1 + n2 + n3 = 1

(4) The multifunctional (meth)acrylate compound "A-BPEF" manufactured by Shin-Nakamura Chemical Co., Ltd. is 9,9-bis[4-(2-acryloyloxyethoxy)phenyl]fluorene, of which chemical formula is as follows.

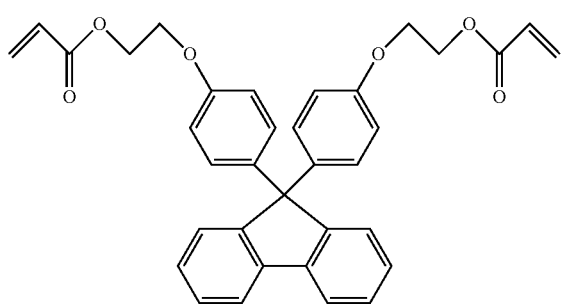 [SMILES: C=CC(=O)OCCOc1ccc(C2(c3ccc(OCCOC(=O)C=C)cc3)c3ccccc3-c3ccccc32)cc1]

(5) The multifunctional (meth)acrylate compound "A-DPH" manufactured by Shin-Nakamura Chemical Co., Ltd. is dipentaerythritol hexaacrylate, of which chemical formula is as follows.

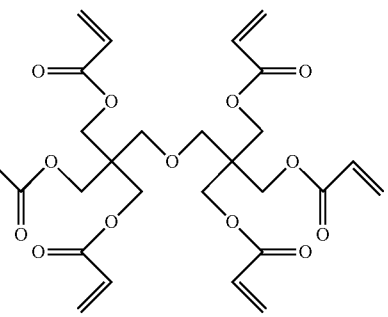

(6) The multifunctional (meth)acrylate compound "A-9550" manufactured by Shin-Nakamura Chemical Co., Ltd. is dipentaerythritol polyacrylate, of which chemical formula is as follows.

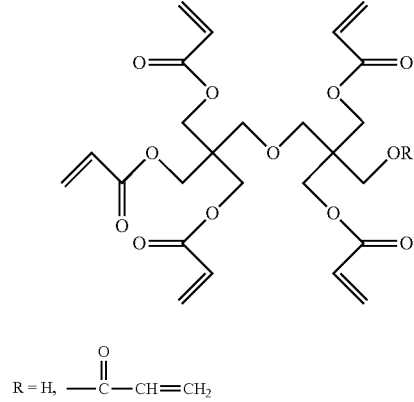

$R = H, -\overset{O}{\underset{\|}{C}}-CH=CH_2$ (7) The multifunctional (meth)acrylate compound "A-BPE-4" manufactured by Shin-Nakamura Chemical Co., Ltd. is ethoxylated bisphenol A diacrylate, of which chemical formula is as follows.

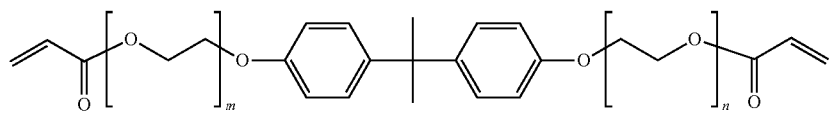

$$m + n = 4$$

(8) The multifunctional (meth)acrylate compound "AD-TMP" manufactured by Shin-Nakamura Chemical Co., Ltd. is ditrimethylolpropane tetraacrylate, of which chemical formula is as follows.

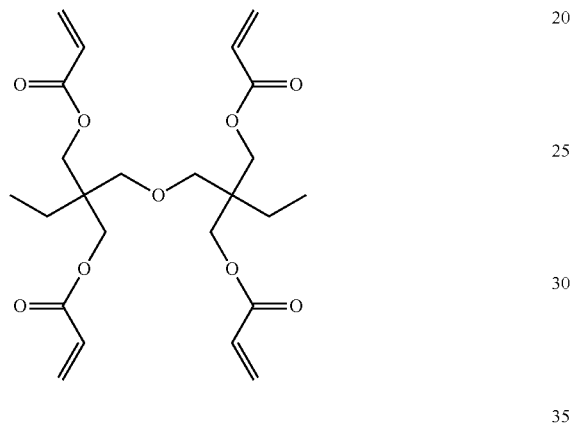

(9) The multifunctional (meth)acrylate compound "UA-306H" manufactured by Kyoeisha Chemical Co., Ltd. is pentaerythritol triacrylate hexamethylene diisocyanate, of which chemical formula is as follows.

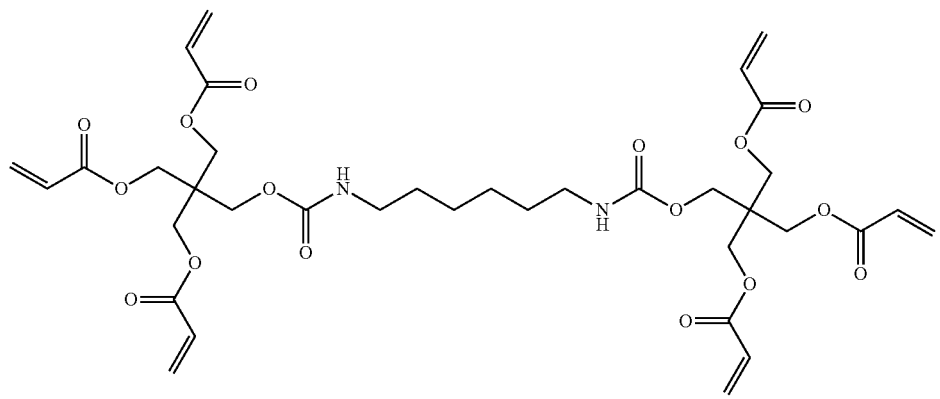 [SMILES: C=CC(=O)OCC(COC(=O)C=C)(COC(=O)C=C)COC(=O)NCCCCCCNC(=O)OCC(COC(=O)C=C)(COC(=O)C=C)COC(=O)C=C]

(10) The multifunctional (meth)acrylate compound "UA-306T" manufactured by Kyoeisha Chemical Co., Ltd. is pentaerythritol triacrylate toluene diisocyanate, of which chemical formula is as follows.

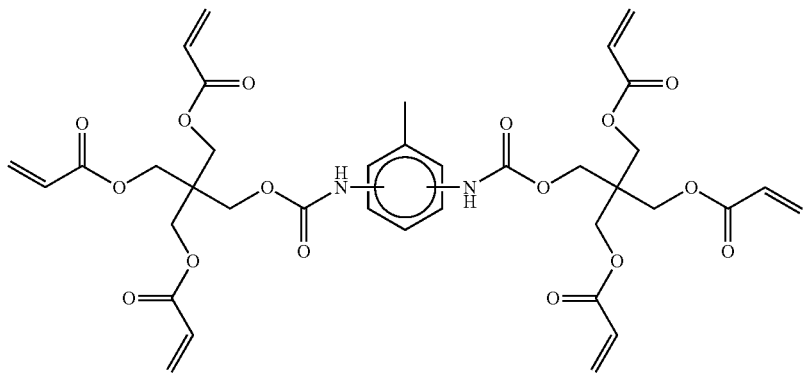

(11) The multifunctional (meth)acrylate compound "UA-306I" manufactured by Kyoeisha Chemical Co., Ltd. is pentaerythritol triacrylate isophorone diisocyanate, of which chemical formula is as follows.

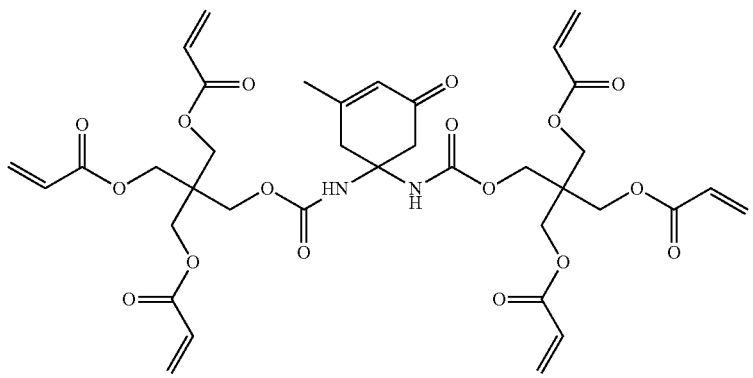 [SMILES: C=CC(=O)OCC(COC(=O)C=C)(COC(=O)C=C)COC(=O)NC1(NC(=O)OCC(COC(=O)C=C)(COC(=O)C=C)COC(=O)C=C)CC(=O)C=C(C)C1]

(12) The multifunctional (meth)acrylate compound "LIGHT ACRYLATE BP-4EAL" manufactured by Kyoeisha Chemical Co., Ltd. is diacrylate of ethylene oxide modified bisphenol A, of which chemical formula is as follows.

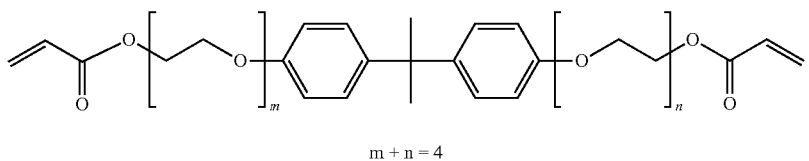

m + n = 4

(13) The multifunctional (meth)acrylate compound "KAYARAD R-712" manufactured by Nippon Kayaku Co., Ltd. has a chemical formula as follows.

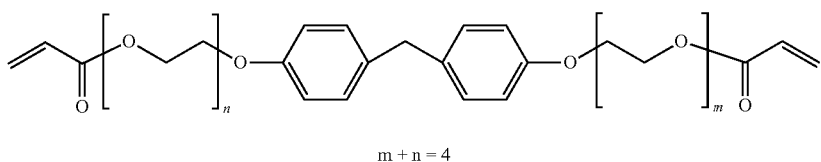

m + n = 4

(14) The multifunctional (meth)acrylate compound "KAYARAD HX-220" manufactured by Nippon Kayaku Co., Ltd. has a chemical formula as follows.

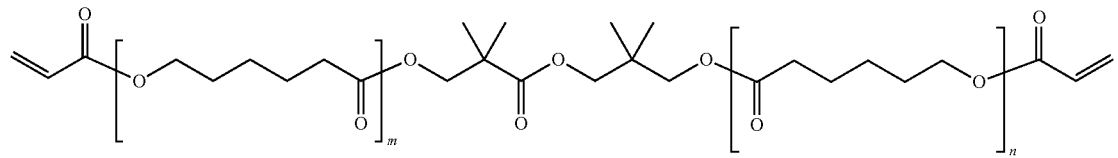

m + n = 2

(15) The multifunctional (meth)acrylate compound "KAYARAD TPA-330" manufactured by Nippon Kayaku Co., Ltd. has a chemical formula as follows.

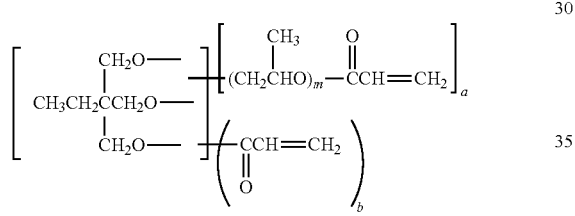

m·a = 3    a + b = 3

(16) The multifunctional (meth)acrylate compound "Viscoat #700HV" manufactured by Osaka Organic Chemical Industry Ltd. is diacrylate of 3.8 mol ethylene oxide modified bisphenol A, of which chemical formula is as follows.

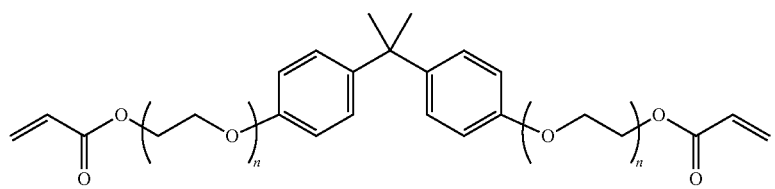

n = 3.8

(17) The multifunctional (meth)acrylate compound "Laromer LR9000" manufactured by BASF has a chemical formula as follows.

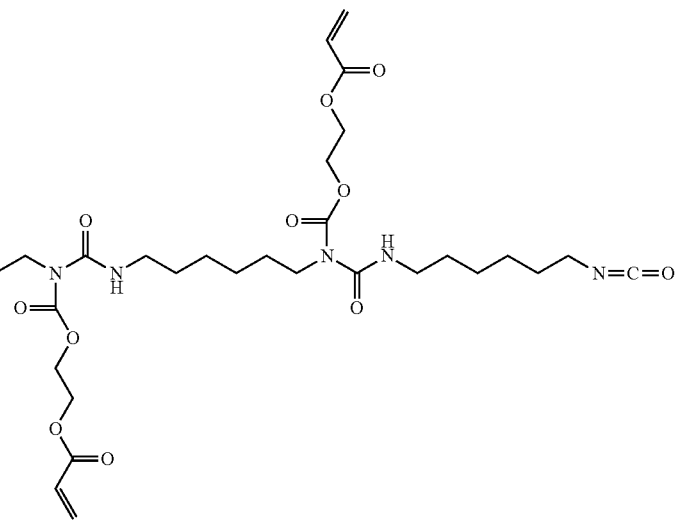

(18) The multifunctional (meth)acrylate compound "KAYARAD PET-30" manufactured by Nippon Kayaku Co., Ltd. has a chemical formula as follows.

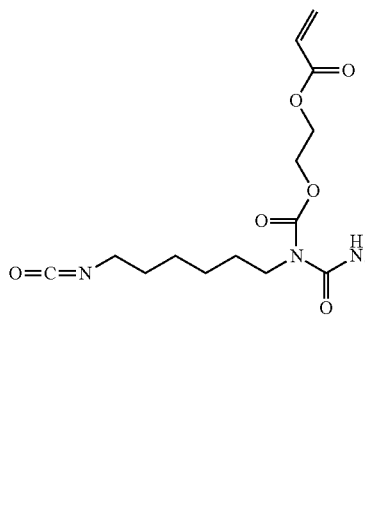

Mixture of ($a \approx 3$, $b \approx 1$) and ($a=4$, $b=0$)

(19) The multifunctional (meth)acrylate compound "Viscoat #802" manufactured by Osaka Organic Chemical Industry Ltd. is a mixture of tripentaerythritol acrylate, mono and dipentaerythritol acrylate, and polypentaerythritol acrylate, of which chemical formula is as follows.

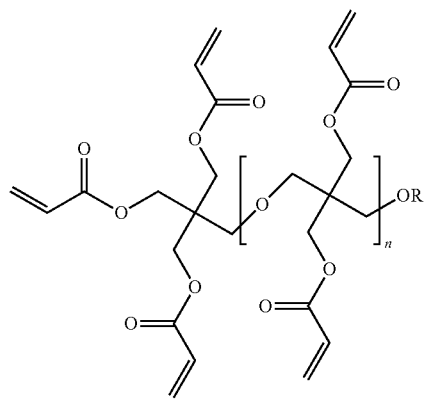

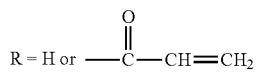

n = 1: 10 - 20%
n = 2: 55 - 65%
n = 3: 5 - 15%

[Description of Evaluation Methods]
[Method for Evaluating Orientation Defect in Liquid Crystal Cured Layer]

An optical film including a liquid crystal cured layer was placed in a polarizing optical microscope ("ECLIPSE LV100POL" manufactured by Nikon Corporation), and the polarizer and analyzer of the polarizing optical microscope were set in a crossed Nicols arrangement to observe the optical film. The observation was performed while the position of the optical film was (i) at the extinction position, and (ii) at a position where the slow axis of the liquid crystal cured layer was shifted from the extinction position by several degrees. The degree of the orientation defect and state of leaked light observed were evaluated in accordance with the following criteria. The orientation defect observed here was linear schlieren defect.

Excellent: no orientation defect was observed, and there was almost no leaked light at the extinction position.

Good: slight orientation defect was observed, and there was slight leaked light at the extinction position.

Poor: obvious orientation defect was observed, and light was leaked at the extinction position.

Separately, a substrate film of the optical film alone was placed in the polarizing optical microscope, and the polarizer and analyzer of the polarizing optical microscope were set in a crossed Nicols arrangement to observe the substrate film alone. As a result of the observation in which the substrate film alone without the liquid crystal cured layer was observed in place of the optical film, no orientation defect was observed and there was no light leakage at the extinction position. On the basis of this result, it was confirmed that the observed orientation defect and light leakage in the aforementioned evaluation were caused by the liquid crystal cured layer.

[Method for Evaluating Hardness of Liquid Crystal Cured Layer]

The haze of the optical film including the liquid crystal cured layer was measured using a haze meter ("HAZE-GARD II" manufactured by Toyo Seiki Co., Ltd.

After that, a rubbing test was performed using a surface-property meter ("HEIDON TRIBOGEAR type 38" manufactured by Shinto Scientific Co., Ltd.). Specifically, the surface of the liquid crystal cured layer of the optical film was rubbed with nonwoven fabric made of lyocell ("TO-RISEPUTA" having a diameter of 12 mm manufactured by Guardner Co., Ltd.) while a load of 200 g was applied thereto. The conditions during rubbing were a moving speed of the nonwoven fabric of 2,000 mm/min, a moving distance of the nonwoven fabric of 30 mm, and a rubbing number with the nonwoven fabric of thirty reciprocations.

The haze of the portion, which had been rubbed with the nonwoven fabric, of the optical film was measured by the aforementioned haze meter.

A difference between the haze values of the optical film after and before the rubbing test was calculated to determine the increased haze value. On the basis of this increased haze value, the hardness of the liquid crystal cured layer was evaluated in accordance with the following criteria.

Excellent: 0.0% to 0.3%
Good: 0.3% to 0.6%
Poor: 0.6% to 0.9%
Fail: 0.9% to 100.0%

Reference Example 1: Evaluation of Wavelength Dispersion of Inverse Wavelength Polymerizable Liquid Crystal Compound (E1)

100.0 Parts of an inverse wavelength polymerizable liquid crystal compound (E1, molecular weight: 1,170) represented by the following formula (E1), and 400.0 parts of 1,3-dioxolane (manufactured by TOHO Chemical Industry Co., Ltd.) as a solvent were mixed to produce a liquid crystal composition.

nm was determined. As a result of the measurement, the ratio Re(450)/Re(650) of the in-plane retardations Re was 0.765. It was thus confirmed that the inverse wavelength polymerizable liquid crystal compound (E1) is capable of exhibiting birefringence with inverse wavelength dispersion.

Reference Example 2. Evaluation of Wavelength Dispersion of Forward Wavelength Polymerizable Liquid Crystal Compound (X1)

A ratio Re(450)/Re(650) of the in-plane retardations of a forward wavelength polymerizable liquid crystal compound (X1) was measured in the same manner as that in Reference Example 1, except that the forward wavelength polymerizable liquid crystal compound (X1) was used in place of the inverse wavelength polymerizable liquid crystal compound (E1) and the type of the solvent used was changed from 1,3-dioxolane to methyl ethyl ketone (manufactured by Maruzen Petrochemical).

As a result of the measurement, the ratio Re(450)/Re(650) of the in-plane retardations of the layer of the forward wavelength polymerizable liquid crystal compound (X1) was 1.188. It was thus confirmed that the forward wavelength polymerizable liquid crystal compound (X1) is capable of exhibiting birefringence with forward wavelength dispersion.

(E1)

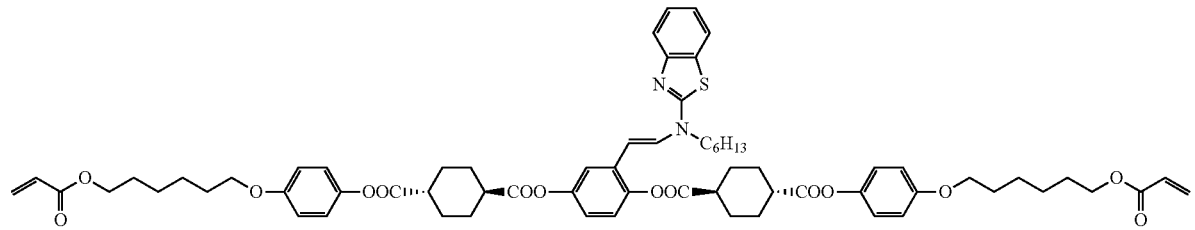

A glass substrate (manufactured by EHC) was prepared. The substrate included a polyimide horizontal orientation film that had been subjected to a rubbing treatment, and was cut to be in a 2.5 cm square shape. Onto the orientation film of the glass substrate, the aforementioned liquid crystal composition was applied by spin coating using a spin coater ("A-200" manufactured by Mikasa Co., Ltd.) to form a layer of the liquid crystal composition. The application conditions employed at this time were a rotation speed of 1,100 rpm and an application time of 5 sec. After that, the solvent was removed from the layer of the liquid crystal composition by air drying, thereby obtaining a sample plate including the glass substrate and the layer of the liquid crystal compound.

The sample plate was heated using a hot stage ("FP-80" manufactured by Mettler Toledo) to cause orientation of the inverse wavelength polymerizable liquid crystal compound (E1) in the layer of the liquid crystal composition. Then, in a state where the inverse wavelength polymerizable liquid crystal compound (E1) had been oriented, the in-plane retardation Re of the layer of the liquid crystal compound was measured. The in-plane retardation Re was measured at measurement wavelengths of 450 nm and 650 nm, and a ratio Re(450)/Re(650) of the in-plane retardation Re(450) at the measurement wavelength of 450 nm to the in-plane retardation Re(650) at the measurement wavelength of 650

Production Example 1. Production of Substrate Film

Pellets of a thermoplastic norbornene resin ("ZEONOR 1420R" manufactured by ZEON Corporation) were dried at 90° C. for 5 hours. The dried pellets were supplied to an extruder and melted therewithin. The melted resin was allowed to pass through a polymer pipe and a polymer filter, and then extruded through a T die onto a casting drum in a film shape and then cooled. This produced a long-length pre-stretch substrate having a thickness of 60 μm and a width of 1,490 mm. The pre-stretch substrate produced was wound up to obtain a roll.

The aforementioned pre-stretch substrate was drawn from the roll and supplied to a tenter stretching machine. The pre-stretch substrate was stretched using the tenter stretching machine so that the slow axis of the stretched substrate after stretching forms an angle of 45° relative to the winding direction of the stretched substrate. Then, the stretched substrate was trimmed at both ends in the film width direction and wound to obtain a long-length stretched substrate having a width of 1,350 mm as the substrate film. The in-plane retardation Re of the resulting substrate film at the measurement wavelength of 550 nm was 148 nm and the thickness thereof was 47 μm.

Examples 1 to 24 and Comparative Examples 1 to 3: Experimental Examples Using Inverse Wavelength Polymerizable Liquid Crystal Compound The inverse wavelength polymerizable liquid crystal compound (E1) represented by the formula (E1), the multifunctional (meth)acrylate compound listed in Table 1, 0.3 parts by weight of a surfactant ("MEGAFACE 562" manufactured by DIC Corporation), and 3 parts by weight of a photopolymerization initiator ("Irgacure 379EG" manufactured by BASF) were mixed and dissolved in 146.5 parts by weight of solvent (cyclopentanone manufactured by ZEON Corporation) and 219.8 parts by weight of solvent (1,3-dioxolane manufactured by TOHO Chemical Industry Co., Ltd.) to dissolve. The mixture was filtrated through a disk filter having a pore size of 0.45 μm to obtain a liquid crystal composition. The amount of the multifunctional (meth)acrylate compound was adjusted as shown in Table 1. The amount of the inverse wavelength polymerizable liquid crystal compound (E1) was adjusted so that the total amount of the inverse wavelength polymerizable liquid crystal compound (E1) and the multifunctional (meth)acrylate compound was 100 parts by weight. Therefore, in Examples in which 1 part by weight of the multifunctional (meth)acrylate compound was used, 99 parts of the inverse wavelength polymerizable liquid crystal compound (E1) was used. In Examples in which 3 parts by weight of the multifunctional (meth)acrylate compound was used, 97 parts of the inverse wavelength polymerizable liquid crystal compound (E1) was used. In Example in which 5 parts by weight of the multifunctional (meth)acrylate compound was used, 95 parts of the inverse wavelength polymerizable liquid crystal compound (E1) was used. In Comparative Examples in which 10 parts by weight of the multifunctional (meth)acrylate compound was used, 90 parts of the inverse wavelength polymerizable liquid crystal compound (E1) was used.

The aforementioned liquid crystal composition was applied onto the surface of the substrate film produced in Production Example 1 using a wire bar (#6), to form a layer of the liquid crystal composition.

The layer of the liquid crystal composition was heated using an oven ("Inert Oven DN410I" manufactured by Yamato Scientific Co., Ltd.) for 4 minutes at 110° C., which is equal to or higher than the temperature at which the inverse wavelength polymerizable liquid crystal compound (E1) exhibits its liquid crystal properties. This heating caused orientation of the inverse wavelength polymerizable liquid crystal compound (E1), and further removed the solvent from the layer of the liquid crystal composition due to drying.

After that, using a conveyer UV irradiation device (manufactured by Eye Graphics Co., Ltd., high-pressure mercury lamp, output: 4 kW, lamp height: 220 mm, conveyance speed: 10 m/min.), the layer of the liquid crystal composition was irradiated with ultraviolet rays (high-pressure mercury lamp) under nitrogen atmosphere for curing, to thereby form a liquid crystal cured layer. The UV irradiation was performed under the conditions of irradiation amount of 240 mJ/cm$^2$ and irradiation intensity of 265 mJ/cm$^2$ using a UV illuminometer ("UVPF-A1(PD-365)" manufactured by Eye Graphics Co., Ltd.). Accordingly, an optical film including the substrate film and the liquid crystal cured layer formed on the surface of the substrate film was obtained. The liquid crystal cured layer formed contained a polymer obtained by polymerization of the inverse wavelength polymerizable liquid crystal compound (E1), the polymer having a homogeneous orientation regularity. The angle of the slow axis of the liquid crystal cured layer was confirmed to be 45° with respect to the winding direction, that is identical with that of the slow axis of the substrate film used for coating.

The optical film obtained in the aforementioned manner was subjected to the above-described methods to evaluate the liquid crystal cured layer thereof.

Comparative Examples 4 to 9: Experimental Examples Using Forward Wavelength Polymerizable Liquid Crystal Compound The forward wavelength polymerizable liquid crystal compound (X1) was used in place of the inverse wavelength polymerizable liquid crystal compound (E1) represented by the formula (E1). An optical film was produced and evaluated in the same manner as that in the above-described Examples 1 to 24 and Comparative Examples 1 to 3 except for the aforementioned matter.

The liquid crystal cured layer included in the produced optical film contained a polymer obtained by polymerizing the forward wavelength polymerizable liquid crystal compound (X1), the polymer having a homogeneous orientation regularity. The angle of the slow axis of the liquid crystal cured layer was 45° with respect to the winding direction.

[Results]

Information of the multifunctional (meth)acrylate compounds used in the aforementioned Examples and Comparative Examples are shown in Table 1, and the results of Examples and Comparative Examples are shown in the following Table 2. Meanings of the abbreviations in the following Tables are as follows.

Mw: molecular weight

Number of Functional Group: number of (meth)acryloyl group per one molecule.

A-TMMT: "A-TMMT" manufactured by Shin-Nakamura Chemical Co., Ltd.

A-DPH-6P: "A-DPH-6P" manufactured by Shin-Nakamura Chemical Co., Ltd.

A-9300-1CL: "A-9300-1CL" manufactured by Shin-Nakamura Chemical Co., Ltd.

A-BPEF: "A-BPEF" manufactured by Shin-Nakamura Chemical Co., Ltd.

A-DPH: "A-DPH" manufactured by Shin-Nakamura Chemical Co., Ltd.

A-9550: "A-9550" manufactured by Shin-Nakamura Chemical Co., Ltd.

A-BPE-4: "A-BPE-4" manufactured by Shin-Nakamura Chemical Co., Ltd.

AD-TMP: "AD-TMP" manufactured by Shin-Nakamura Chemical Co., Ltd.

UA-306H: "UA-306H" manufactured by Kyoeisha Chemical Co., Ltd.

UA-306T: "UA-306T" manufactured by Kyoeisha Chemical Co., Ltd.

UA-306I: "UA-306I" manufactured by Kyoeisha Chemical Co., Ltd.

BP-4EAL: "LIGHT ACRYLATE BP-4EAL" manufactured by Kyoeisha Chemical Co., Ltd.

R-712: "KAYARAD R-712" manufactured by Nippon Kayaku Co., Ltd.

HX-220: "KAYARAD HX-220" manufactured by Nippon Kayaku Co., Ltd.

TPA-330: "KAYARAD TPA-330" manufactured by Nippon Kayaku Co., Ltd.

V #700HV: "Viscoat #700HV" manufactured by Osaka Organic Chemical Industry Ltd.

LR9000: "Laromer LR9000" manufactured by BASF

PET-30: "KAYARAD PET-30" manufactured by Nippon Kayaku Co., Ltd.

V #802: "Viscoat #802" manufactured by Osaka Organic Chemical Industry Ltd.

TABLE 1

[Multifunctional (meth)acrylate compounds used in Examples and Comparative Examples]

| | Sample name | Mw | Number of Functional Group | Acrylic equivalent | Number of the aromatic rings | Amount [parts] |
|---|---|---|---|---|---|---|
| Ex. 1 | A-TMMT | 352 | 4 | 88 | 0 | 3 |
| Ex. 2 | A-TMMT | 352 | 4 | 88 | 0 | 5 |
| Ex. 3 | A-DPH-6P | Not confirmed | 6 | Not confirmed | 0 | 1 |
| Ex. 4 | A-DPH-6P | Not confirmed | 6 | Not confirmed | 0 | 3 |
| Ex. 5 | A-9300-1CL | 537.5 | 3 | 179 | 0 | 5 |
| Ex. 6 | A-BPEF | 546.6 | 2 | 273 | 4 | 5 |
| Ex. 7 | A-DPH | 578.6 | 6 | 96 | 0 | 1 |
| Ex. 8 | A-DPH | 578.6 | 6 | 96 | 0 | 3 |
| Ex. 9 | A-DPH | 578.6 | 6 | 96 | 0 | 5 |
| Ex. 10 | A-9550 | 524.5-578.6 | 5, 6 | 87-115 | 0 | 3 |
| Ex. 11 | A-BPE-4 | 512.6 | 2 | 256 | 2 | 5 |
| Ex. 12 | AD-TMP | 466 | 4 | 117 | 0 | 3 |
| Ex. 13 | AD-TMP | 466 | 4 | 117 | 0 | 5 |
| Ex. 14 | UA-306H | 764.8 | 6 | 127 | 0 | 3 |
| Ex. 15 | UA-306T | 798.8 | 6 | 133 | 1 | 3 |
| Ex. 16 | UA-306T | 798.8 | 6 | 133 | 1 | 5 |
| Ex. 17 | UA-306I | 816.8 | 6 | 136 | 0 | 5 |
| Ex. 18 | BP-4EAL | 512.6 | 2 | 256 | 2 | 5 |
| Ex. 19 | R-712 | 484.5 | 2 | 242 | 2 | 5 |
| Ex. 20 | HX-220 | 540.6 | 2 | 270 | 0 | 5 |
| Ex. 21 | TPA330 | 470.6 | 3 | 157 | 0 | 5 |
| Ex. 22 | V#700HV | 512.6 | 2 | 256 | 2 | 5 |
| Ex. 23 | LR9000 | 1021.1 | 3 | 340 | 0 | 3 |
| Ex. 24 | LR9000 | 1021.1 | 3 | 340 | 0 | 5 |
| Comp. Ex. 1 | A-TMMT | 352 | 4 | 88 | 0 | 10 |
| Comp. Ex. 2 | PET-30 | 298.3-352.3 | 3, 4 | 74-117 | 0 | 10 |
| Comp. Ex. 3 | V#802 | 804.8(value on catalog) | 6-10 | 80-134 | 0 | 10 |
| Comp. Ex. 4 | A-TMMT | 352 | 4 | 88 | 0 | 3 |
| Comp. Ex. 5 | A-TMMT | 352 | 4 | 88 | 0 | 5 |
| Comp. Ex. 6 | UA-306H | 764.8 | 6 | 127 | 0 | 3 |
| Comp. Ex. 7 | UA-306H | 764.8 | 6 | 127 | 0 | 5 |
| Comp. Ex. 8 | LR9000 | 1021.1 | 3 | 340 | 0 | 3 |
| Comp. Ex. 9 | LR9000 | 1021.1 | 3 | 340 | 0 | 5 |

TABLE 2

Results of Examples and Comparative Examples

| | Liquid crystal compound | Orientation quality | Hardness | Increased haze value |
|---|---|---|---|---|
| Ex. 1 | Inverse wavelength | Excellent | Good | 0.57% |
| Ex. 2 | Inverse wavelength | Good | Excellent | 0.24% |
| Ex. 3 | Inverse wavelength | Excellent | Good | 0.56% |
| Ex. 4 | Inverse wavelength | Good | Good | 0.39% |
| Ex. 5 | Inverse wavelength | Excellent | Good | 0.46% |
| Ex. 6 | Inverse wavelength | Excellent | Good | 0.57% |
| Ex. 7 | Inverse wavelength | Excellent | Good | 0.49% |
| Ex. 8 | Inverse wavelength | Good | Good | 0.60% |
| Ex. 9 | Inverse wavelength | Good | Excellent | 0.28% |
| Ex. 10 | Inverse wavelength | Good | Good | 0.54% |
| Ex. 11 | Inverse wavelength | Excellent | Good | 0.58% |
| Ex. 12 | Inverse wavelength | Excellent | Good | 0.54% |
| Ex. 13 | Inverse wavelength | Good | Good | 0.48% |
| Ex. 14 | Inverse wavelength | Excellent | Good | 0.36% |
| Ex. 15 | Inverse wavelength | Excellent | Good | 0.54% |
| Ex. 16 | Inverse wavelength | Good | Good | 0.49% |
| Ex. 17 | Inverse wavelength | Good | Good | 0.39% |
| Ex. 18 | Inverse wavelength | Excellent | Good | 0.59% |
| Ex. 19 | Inverse wavelength | Excellent | Good | 0.52% |
| Ex. 20 | Inverse wavelength | Excellent | Good | 0.50% |
| Ex. 21 | Inverse wavelength | Excellent | Good | 0.47% |
| Ex. 22 | Inverse wavelength | Excellent | Good | 0.50% |
| Ex. 23 | Inverse wavelength | Excellent | Excellent | 0.13% |
| Ex. 24 | Inverse wavelength | Good | Excellent | 0.15% |
| Comp. Ex. 1 | Inverse wavelength | Poor | — | — |
| Comp. Ex. 2 | Inverse wavelength | Poor | — | — |
| Comp. Ex. 3 | Inverse wavelength | Poor | — | — |
| Comp. Ex. 4 | Forward wavelength | Poor | — | — |
| Comp. Ex. 5 | Forward wavelength | Poor | — | — |
| Comp. Ex. 6 | Forward wavelength | Poor | — | — |
| Comp. Ex. 7 | Forward wavelength | Poor | — | — |
| Comp. Ex. 8 | Forward wavelength | Poor | — | — |
| Comp. Ex. 9 | Forward wavelength | Poor | — | — |

[Discussion]

In Comparative Examples 1 to 3 in which the amounts of the multifunctional (meth)acrylate compound were in excess, the orientation defect in the liquid crystal cured layer could not be suppressed. On the contrary, in Examples 1 to 24 in which the amounts of the multifunctional (meth) acrylate compounds were confined within the specific range, the liquid crystal cured layers having a high hardness and suppressed orientation defect was obtained. On the basis of these results, it was confirmed that when the amount of the multifunctional (meth)acrylate compound contained in the liquid crystal composition containing the inverse wavelength polymerizable liquid crystal compound and the multifunctional (meth)acrylate compound is confined within a specific range, the resulting liquid crystal cured layer can have a high hardness and suppressed orientation defect.

In Comparative Examples 4 to 9 which did not employ the inverse wavelength polymerizable liquid crystal compound but employed the forward wavelength polymerizable liquid crystal compound in combination with the multifunctional (meth)acrylate compound, even though the amount of the multifunctional (meth)acrylate compound is confined within the specific range, the orientation defect in the liquid crystal cured layer cannot be suppressed. On the basis of these results, it was confirmed that the effect of being capable of producing the liquid crystal cured layer having a high hardness and suppressed orientation defect is not an effect obtained in the liquid crystal composition containing the forward wavelength polymerizable liquid crystal compound and the multifunctional (meth)acrylate compound, but an effect that is obtained specifically in the liquid crystal composition containing the inverse wavelength polymerizable liquid crystal compound and the multifunctional (meth)acrylate compound.

The invention claimed is:

1. A liquid crystal composition comprising:
a polymerizable liquid crystal compound capable of expressing birefringence with inverse wavelength dispersion; and
a (meth)acrylate compound containing two or more (meth)acryloyl groups per one molecule, wherein:
an amount of the (meth)acrylate compound is 8 parts by weight or less, the amount being relative to 100 parts by weight of a sum total of the polymerizable liquid crystal compound and the (meth)acrylate compound,
the (meth)acrylate compound is a non-liquid crystal compound, and
the (meth)acrylate compound contains an isocyanate group.

2. The liquid crystal composition according to claim 1, wherein the (meth)acrylate compound has an acrylic equivalent of 140 or lower.

3. The liquid crystal composition according to claim 1, wherein the polymerizable liquid crystal compound contains a main chain mesogen and a side chain mesogen bonded to the main chain mesogen in a molecule of the polymerizable liquid crystal compound.

4. The liquid crystal composition according to claim 1, wherein the polymerizable liquid crystal compound is represented by the following Formula (I):

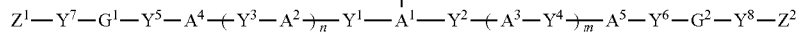

(in the Formula (I), $Y^1$ to $Y^8$ rare each independently a chemical single bond, —O—, —S—, —O—C(=O)—, —C(=O)—O—, —O—C(=O)—O—, —NR$^1$—C(=O)—, —C(=O)—NR$^1$—, —O—C(=O)—NR$^1$—, —NR$^1$—C(=O)—O—, —NR$^1$—C(=O)—NR$^1$—, —O—NR$^1$—, or —NR$^1$—O—, wherein R$^1$ is a hydrogen atom or an alkyl group of 1 to 6 carbon atoms;

$G^1$ and $G^2$ are each independently a divalent aliphatic group of 1 to 20 carbon atoms optionally having a substituent; the aliphatic groups may have one or more per one aliphatic group of —O—, —S—, —O—C(=O)—, —C(=O)—O—, —O—C(=O)—O—, —NR$^2$—C(=O)—, —C(=O)—NR$^2$—, —NR$^2$—, or —C(=O)— inserted therein; with a proviso that cases where two or more of each of —O— or —S— groups are adjacently inserted are excluded, wherein R$^2$ is a hydrogen atom or an alkyl group of 1 to 6 carbon atoms;

$Z^1$ and $Z^2$ are each independently an alkenyl group of 2 to 10 carbon atoms optionally being substituted by a halogen atom;

$A^x$ is an organic group of 2 to 30 carbon atoms having at least one aromatic ring selected from the group consisting of an aromatic hydrocarbon ring and an aromatic heterocyclic ring;

$A^y$ is a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—R$^3$, —SO$_2$—R$^4$, —C(=S)NH—R$^9$, or an organic group of 2 to 30 carbon atoms having at least one aromatic ring selected from the group consisting of an aromatic hydrocarbon ring and an aromatic heterocyclic ring, wherein R$^3$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms; R$^4$ is an alkyl group of 1 to 20 carbon atoms, an alkenyl group of 2 to 20 carbon atoms, a phenyl group, or a 4-methylphenyl group; R$^9$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent; the aromatic ring that $A^x$ and $A^y$ have may have a substituent; and $A^x$ and $A^y$ may form a ring together;

$A^1$ is a trivalent aromatic group optionally having a substituent;

$A^2$ and $A^3$ are each independently a divalent alicyclic hydrocarbon group of 3 to 30 carbon atoms optionally having a substituent;

$A^4$ and $A^5$ are each independently a divalent aromatic group of 6 to 30 carbon atoms optionally having a substituent;

$Q^1$ is a hydrogen atom or an alkyl group of 1 to 6 carbon atoms optionally having a substituent; and m and n are each independently 0 or 1).

5. A liquid crystal cured layer formed of a cured product of the liquid crystal composition according to claim 1.

6. The liquid crystal cured layer according to claim 5, wherein an increased haze value is 0.6% or less when a surface of the liquid crystal cured layer is rubbed with nonwoven fabric having a diameter of 12 mm and made of lyocell under conditions of an application load of 200 g, a moving speed of the nonwoven fabric of 2,000 mm/min, a moving distance of the nonwoven fabric of 30 mm, and a rubbing number with the nonwoven fabric of thirty reciprocations.

7. A method for producing a liquid crystal cured layer, comprising:
   a step of forming a layer of the liquid crystal composition according to claim 1 on a supporting surface;
   a step of causing orientation of the polymerizable liquid crystal compound contained in the layer of the liquid crystal composition; and
   a step of curing the layer of the liquid crystal composition.

8. An optical film comprising the liquid crystal cured layer according to claim 5.

9. The method for producing a liquid crystal cured layer according to claim 7, further comprising
   a step of peeling the liquid crystal cured layer from the supporting surface.

\* \* \* \* \*